United States Patent
Situnayake et al.

(10) Patent No.: US 12,443,470 B2
(45) Date of Patent: Oct. 14, 2025

(54) DETERMINING A POST-PROCESSING CONFIGURATION FOR POST-PROCESSING OUTPUT DATA FROM A PIPELINE

(71) Applicant: EdgeImpulse Inc., San Jose, CA (US)

(72) Inventors: Daniel Situnayake, Mt. Pleasant, SC (US); Johannes Jongboom, Amsterdam (NL); Sergi Mansilla Molins, Barcelona (ES)

(73) Assignee: EDGEIMPULSE INCORPORATED, San Diego, CA (US)

( * ) Notice: Subject to any disclaimer, the term of this patent is extended or adjusted under 35 U.S.C. 154(b) by 548 days.

(21) Appl. No.: 18/079,963

(22) Filed: Dec. 13, 2022

(65) Prior Publication Data
US 2024/0193018 A1    Jun. 13, 2024

(51) Int. Cl.
*G06F 9/54* (2006.01)

(52) U.S. Cl.
CPC .............. *G06F 9/544* (2013.01); *G06F 9/542* (2013.01)

(58) Field of Classification Search
None
See application file for complete search history.

(56) References Cited

U.S. PATENT DOCUMENTS

| | | | | |
|---|---|---|---|---|
| 2006/0064246 A1* | 3/2006 | Medberry | G16B 25/00 | 702/19 |
| 2013/0212154 A1* | 8/2013 | Lehto | G06Q 10/0631 | 709/203 |
| 2016/0098306 A1* | 4/2016 | Chang | G06F 9/546 | 719/314 |

OTHER PUBLICATIONS

O'Reilly TinyML Machine Learning with TensorFlow Lite on Arduino and Ultra-Low-Power Microcontrollers by Pete Warden and Daniel Situnayake; 2020; "Understanding the Model Output" at p. 213; 6 pages.
Tensorflow by Pete Warden and Yu-Cheng Ling; 2017; Accessed Mar. 6, 2023; https://github.com/tensorflow/tensorflow/blob/be4f6874533d78f662d9777b66abe3cdde98f901/tensorflow/lite/experimental/micro/examples/micro_speech/recognize_commands.cc <https://nam10.safelinks.protection.outlook.com/?url=https%3A%2F%2Fgithub.com%2Ftensorflow%2Ftensorflow%2Fblob%2Fbe4f6874533d78f662d9777b66abe3cdde98f901%2Ftensorflow%2Flite%2Fexperimental%2Fmicro%2Fexamples%2Fmicro_speech%2Frecognize_commands.

* cited by examiner

*Primary Examiner* — Craig C Dorais
(74) *Attorney, Agent, or Firm* — Polsinelli LLP

(57) ABSTRACT

A system may configure a pipeline for a target device. The pipeline may include a signal processing component and a machine learning component. The pipeline may be configured to receive input data and generate output data based on the input data. For example, the output data may indicate detections in an output stream based on events in the input data in an input stream. The system may determine multiple post-processing configurations for post-processing the output data. A post-processing configuration may be configured to generate a detectable event based on the output data. The multiple post-processing configurations may be generated using a multi-objective optimization that varies one or more parameters for generating the detectable event.

20 Claims, 24 Drawing Sheets

DETERMINING A POST-PROCESSING CONFIGURATION FOR POST-PROCESSING OUTPUT DATA FROM A PIPELINE

TECHNICAL FIELD

This disclosure relates generally to machine learning and, more specifically, to determining a post-processing configuration for post-processing output data from a pipeline.

BACKGROUND

Machine learning, or artificial intelligence, refers to a system that uses data to perform tasks. A machine learning model may be built for a system based on training data (e.g., a dataset). The machine learning model may then be deployed to make predictions (e.g., predictions that an application can use to help guide decisions, such as predictions for image or sound classification), to generate data, and/or to transform data.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
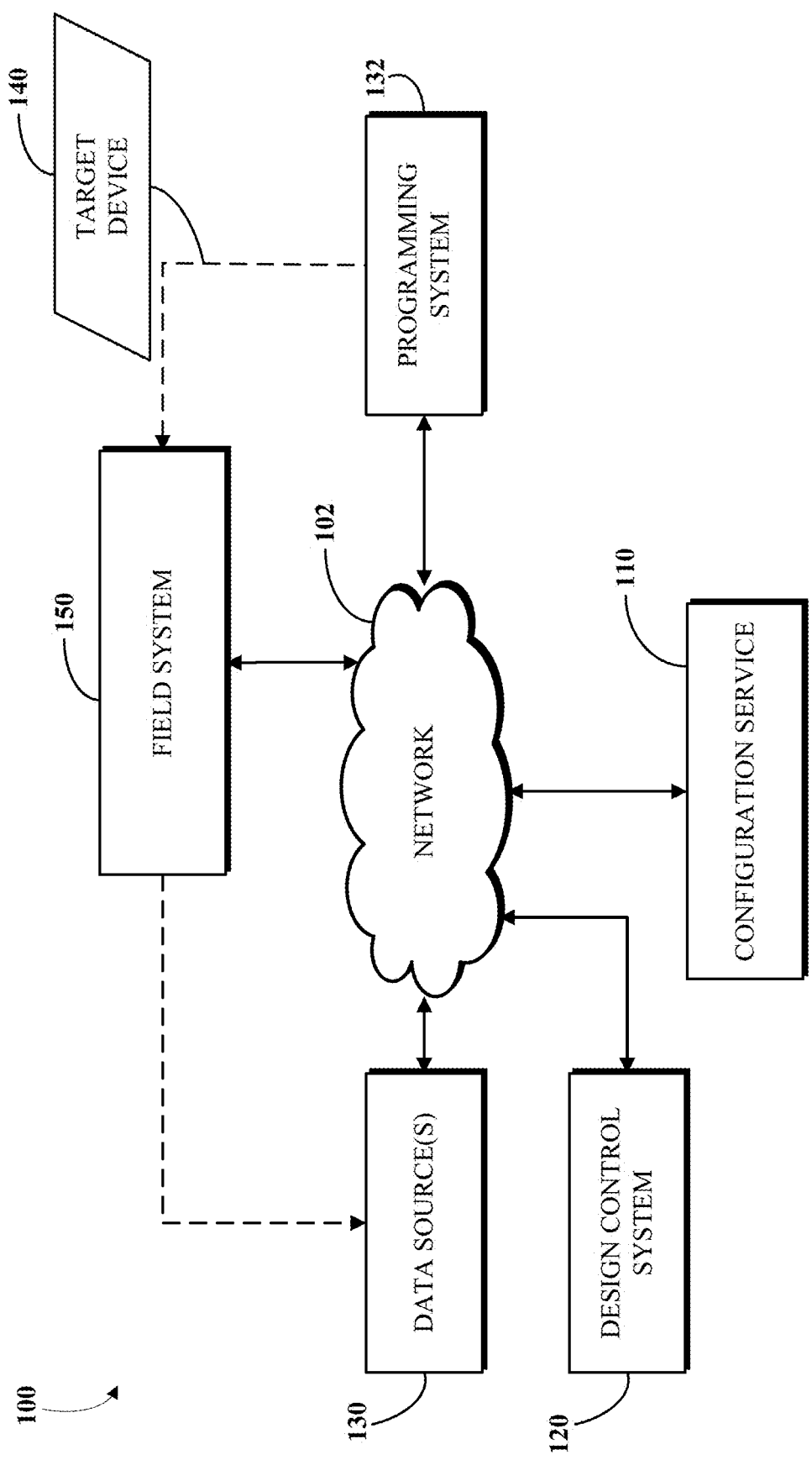
FIG. 1 is a block diagram of an example of a system for facilitating configuration and deployment of a pipeline.

Embedded machine learning permits an electronic device, such as a microcontroller, to implement a machine learning model to make predictions (e.g., that an application can use to help guide decisions), to generate data, and/or to transform data. For example, a device with embedded machine learning may receive a sample of data (e.g., input from a sensor) and may use a machine learning model to predict a result based on the sample without accessing software in the cloud. However, there are different ways a machine learning model may be configured for a given application. For example, the machine learning model may include an artificial neural network (or simply a "neural network"), and hyperparameters associated with the neural network may be configured in different ways to achieve different levels of accuracy and/or inference times.

Additionally, there may be constraints associated with a given application. For example, a machine learning model used to predict the busyness of a shopping center might tolerate a greater inference time (e.g., an amount of time for the machine learning model to process input data and produce output data, such as a prediction) than a machine learning model used to predict the movement of an unmanned aerial vehicle (UAV) that may be in flight. Further, there are different devices that could be used when implementing a machine learning model. For example, one device might be more complex with a processor that includes a more execution units, a deep learning accelerator, support for floating point (FP) instructions, and instruction and data caches, while another device might be less complex with a processor that includes a fewer execution units, a lack of support for FP instructions, and a lack of instruction and data caches. In some cases, the device that is more complex could have a heterogenous architecture that uses multiple types of processors and instruction sets. Moreover, the different devices might operate at different clock frequencies. Thus, the performance of such devices may vary.

Additionally, implementing the machine learning model on the different devices may involve utilizing different software toolchains, with the more complex devices sometimes involving more complex software in the toolchain that may be difficult for a user to configure. As a result, it may be time consuming and/or difficult for an engineer to configure a machine learning model for a given application and/or a given device, or for an engineer to port a given application onto multiple different devices. It is therefore desirable to implement a machine learning model for a given application and/or a given device while reducing the time and/or the burden associated with the implementation.

Implementations of this disclosure address problems such as these by receiving an input indicating a target device (e.g., a specified microcontroller, board, computer, or mobile phone) and automatically determining the performances of multiple configurations of a pipeline (sometimes referred to as machine learning pipeline or an impulse), based on the target device indicated by the input, for implementing a configuration of the multiple configurations on the target device. The pipeline may include one or more signal processing components (e.g., one or more components implementing a digital signal processing (DSP) algorithm) and one or more machine learning components (e.g., one or more components implementing conditional logic, a neural network, a heuristic algorithm, or other learning algorithm or classifier). The one or more signal processing components and the one or more machine learning components may be connected to one another in various ways.

A configuration of the pipeline may include one or more parameters for configuring the signal processing component (e.g., settings that affect signal processing calculations, such as a particular DSP algorithm or noise floor) and/or the machine learning component (e.g., settings that affect machine learning, such as hyperparameters including neural network topology, size, or training). Configurations of the multiple configurations may vary in the one or more parameters that are used, and therefore may vary in configurations of the one or more signal processing components and/or the one or more machine learning components. The performance of a configuration may be determined based on the target device, and the target device may be indicated by the input. For example, the target device may be indicated by a user via selection of the target device from a library of multiple possible target devices. The target device could be, for example, a device (e.g., a microcontroller or board), a computer, or a mobile phone. In some implementations, the target device could comprise a system running in a cloud server. The performance of a configuration may also be determined based on an application constraint (e.g., a targeted latency, accuracy, memory usage, and/or energy usage), and the application constraint may be indicated by an input. For example, the application constraint may be indicated by a user for meeting the needs of a given application (e.g., achieving a shorter inference time for predicting the movement of a UAV).

In some implementations, the performance of a configuration may be determined by calculating a latency (e.g., an inference time), a memory usage (e.g., a random access memory (RAM) and/or a read only memory (ROM) usage), an energy usage (e.g., power consumption), and/or level of accuracy associated with the configuration when implemented on the target device. For example, the latency, or inference time, may be an amount of time for the configuration of the pipeline to process input data and produce output data when the configuration is implemented on a target device; the memory usage may be a peak amount of RAM and/or a peak amount of ROM, measured in kilobytes or megabytes, consumed by the target device when implementing the configuration; the energy usage may be a peak amount of power, measured in watts, consumed by the target device when implementing the configuration; and the accuracy may be a fraction or percentage of predictions that the target device correctly determines when implementing the configuration. In some implementations, the performance (e.g., the latency, memory usage, energy usage, or accuracy) of a configuration may be determined by simulating the target device implementing the configuration (e.g., determining the performance based on characteristics of the target device, such as the architecture of a device). In some implementations, the performance of a configuration may be determined by referencing one or more benchmarks associated with the target device (e.g., predetermined performance data from a look up table or other data structure) and applying the one or more benchmarks to estimate the performance of the configuration when the target device implements the configuration. In some cases, a machine learning model or heuristic algorithm may be used to predict the performance of the configuration based on the one or more benchmarks. This may permit determining the performance more quickly when using benchmarks. In some implementations, the configurations may be ranked based on their performances. In some implementations, the performance of a configuration may be compared to an application constraint (e.g., a targeted latency, accuracy, memory usage, and/or energy usage) indicated by an input. In some implementations, a configuration may be selected, based on the configuration satisfying the application constraint, for implementing the configuration on the target device (e.g., a microcontroller or board implementing a given architecture). In some implementations, the configuration may be implemented on a target device by utilizing a software toolchain for the target device, such as for generating firmware. In some implementations, implementing the configuration on a target device may include determining portions of the pipeline to be implemented on various cores of a heterogenous device, and distributing a computational workload associated with the pipeline across the various cores. In some implementations, a graphical user interface (GUI) may be used when configuring the pipeline.

As a result, a pipeline including one or more signal processing components and one or more machine learning components may be determined for an application and/or a device while reducing the time and/or the burden associated with making the determination. Further, the pipeline may be implemented on a target device while reducing the time and/or the burden associated with utilizing the software toolchain for the target device. Additionally, by determining configurations that include signal processing and machine learning components, trade-offs between signal processing efficiency (e.g., utilization of the signal processing component) and machine learning efficiency (e.g., utilization of the machine learning component) may be achieved.

In some cases, a post-processing algorithm, or post-processing stage, can be used to post-process output data generated by a machine learning model (e.g., to post-process the predictions that are generated by the model, for an application to use). For example, a model could receive time series input data in a first stream, such as audio data from a microphone. The model may be trained to generate output data in a second stream, such as detections based on the input data. For example, the model could be a sound classifier configured to detect utterances of keywords, and the detections could be detections of the keywords in the input stream. To generate the output data, the model can take a window of the input data (e.g., a timed duration, such as one second) and classify the contents of the window with respect to whether it contains a particular signal, such as the keyword. However, when the model receives the input data in the first stream (e.g., particularly during real-time sampling, such as real time speech monitoring), the output data may reflect the contents of a sequence of overlapping windows in the second stream. A post-processing stage can be used to transform the second stream into discrete detectable events that can be used by an application. For example, the post-processing stage could average the output data so that the application can receive a discrete detectable event, as opposed to a series of detections in a stream.

The post-processing stage can apply different parameters for post-processing the output data. For example, the parameters may control filtering and/or thresholding of the output data in the second stream. As a result, the parameters may bias the post-processing stage in its generation of the detectable events. For example, the parameters may bias the post-processing stage to increase false negatives in predictions (e.g., failures to detect occurrences of events, quantified as a false rejection rate) and decrease false positives in predictions (e.g., failures to accept non-occurrences of events, quantified as a false acceptance rate), or decrease false negatives and increase false positives. This may represent a tradeoff that may be achieved by the post-processing stage (e.g., a tradeoff between false negatives and false positives). The degree of an acceptable tradeoff may depend on the application. For example, if an application is designed to detect an urgent medical situation such as a patient fall, it may be important to minimize false negatives (e.g., to be more sensitive in the detection, so that a patient fall is not missed). If an application is designed to detect keywords spoken by a user, such as for controlling a smart home device, it may be desirable to reduce false positives (e.g., to be less sensitive in the detection, so that settings such as lights do not frequently change). Conventional tools lack an understanding of such preferences of users in applications, instead often relying on the involvement of a skilled engineer for determining parameters for post-processing. This may be time consuming and burdensome, and in some cases, the post-processing stage still might not be optimized.

Implementations of this disclosure address problems such as these by determining an optimal set of post-processing configurations representing a tradeoff between precision and recall, or a false acceptance rate and false rejection rate, and, in some cases, structuring input data for testing the post-processing configurations (e.g., performance calibration). A system may configure a pipeline for a target device (e.g., an embedded device, microcontroller or other constrained device, which may be limited by power, processing speed, and/or memory). For example, the pipeline could implement a sound classifier configured to detect the utterances of keywords in audio data, such as "yes" or "no." The pipeline may include a signal processing component and a machine learning component. The pipeline may be configured to receive input data in a first stream (e.g., time series data from a sensor, such as audio data from a microphone) and generate output data in a second stream. The output data may indicate detections based on the input data (e.g., detections of the keywords in the audio data). The system may determine multiple post-processing configurations for post-processing the output data. A post-processing configuration may be configured to generate a detectable event based on the detections in the output data. For example, the post-processing configuration may generate a discrete detectable event based on detections in a sequence of overlapping windows in the second stream. The multiple post-processing configurations may be generated using a multi-objective optimization that varies one or more parameters for generating the detectable event. As a result, an optimal post-processing stage for embedded machine learning can be selected by a user for a given application.

FIG. 1 is a block diagram of an example of a system 100 for facilitating configuration and deployment of a pipeline. The system 100 may include a network 102, a configuration service 110 (e.g., a machine learning pipeline or impulse configuration service), a design control system 120, one or more data sources 130, a programming system 132, and/or a field system 150. A user may utilize the design control system 120 to command the configuration service 110 via network communications over the network 102. For example, a user may utilize a web client or a scripting application program interface (API) client that may be implemented by the design control system 120 to command the configuration service 110.

The configuration service 110 may be used to configure a pipeline to be implemented by a target device. The pipeline may include one or more signal processing components and one or more machine learning components that may be connected to one another in various ways. The target device may be indicated by a user, such as by selection of a target device from a library of multiple possible target devices. For example, the user may utilize the design control system 120 to indicate the selection of the target device to the configuration service 110. The target device could be, for example, a device (e.g., a microcontroller or board), a computer, or a mobile phone. In some implementations, the target device could comprise a system running in a cloud server.

The one or more data sources 130 may be used to provide input data (e.g., raw data) to the configuration service 110 via network communications over the network 102. The input data may be used by the configuration service 110 to generate one or more datasets that may be used to configure, train, and/or test a configuration of the pipeline. The one or more data sources 130 could be selected and/or configured by the user via the design control system 120. The one or more data sources 130 could also be configured by the configuration service 110 for transferring the input data from the one or more data sources 130 to the configuration service 110. The one or more data sources 130 may include, for example, one or more servers, computers, mobile phones, or other electronic devices, such as microcontrollers or boards.

The configuration service 110 may deploy a configuration of the pipeline to a target device 140. In some implementations, the target device 140 could be a device, such as a microcontroller or board. The configuration service 110 may communicate with the programming system 132 via network communications over the network 102 to program the target device 140 (e.g., the device). For example, the configuration service 110 may generate software and/or firmware for deploying the configuration of the pipeline. The configuration service 110 may communicate with the programming system 132 to send the software and/or firmware to the programming system 132. The programming system 132 may use the software and/or firmware to program the target device 140 (e.g., the configuration service 110 may generate a binary that the programming system 132 may use to flash, or program the ROM, of the device). Thus, the target device 140, when programmed, may implement a configuration of the pipeline that may be used for machine learning on a target device having constraints (e.g., embedded machine learning).

In some implementations, the target device 140 could be a computer or a mobile phone. The configuration service 110 may communicate with the computer or the mobile phone, via network communications over the network 102, to program the computer or the mobile phone. For example, the configuration service 110 may generate software for deploying the configuration of the pipeline to the computer or the mobile phone. The configuration service 110 may communicate with the computer or the mobile phone to send the software to the computer or the mobile phone for the computer or the mobile phone to execute. Thus, the computer or the mobile phone, when using the software, may implement a configuration of the pipeline that may be used for machine learning on a target having constraints (e.g., embedded machine learning). In some cases, the configuration service 110 may generate software for deploying the configuration of the pipeline to a library. A computer or other device, such as the target device 140, may use the library to implement a configuration of the pipeline.

In some implementations, the target device 140 may be implemented in the field system 150. The field system could be an intelligent device that uses the target device 140 to make predictions that can help guide decisions for an application. For example, the field system 150 could be an edge device, a medical device, a wearable device, or other device including a processor.

In some implementations, the field system 150, implementing the target device 140, may also serve as a data source like the one or more data sources 130. For example, the target device 140 may be used to provide input data to the configuration service 110, via the field system 150 and network communications over the network 102. The configuration service 110 may use the input data from the target device 140, like input data from the one or more data sources 130, to configure, train, and/or test a pipeline implemented by the target device 140 and/or another pipeline to be implemented by another target device.

Figure 2:
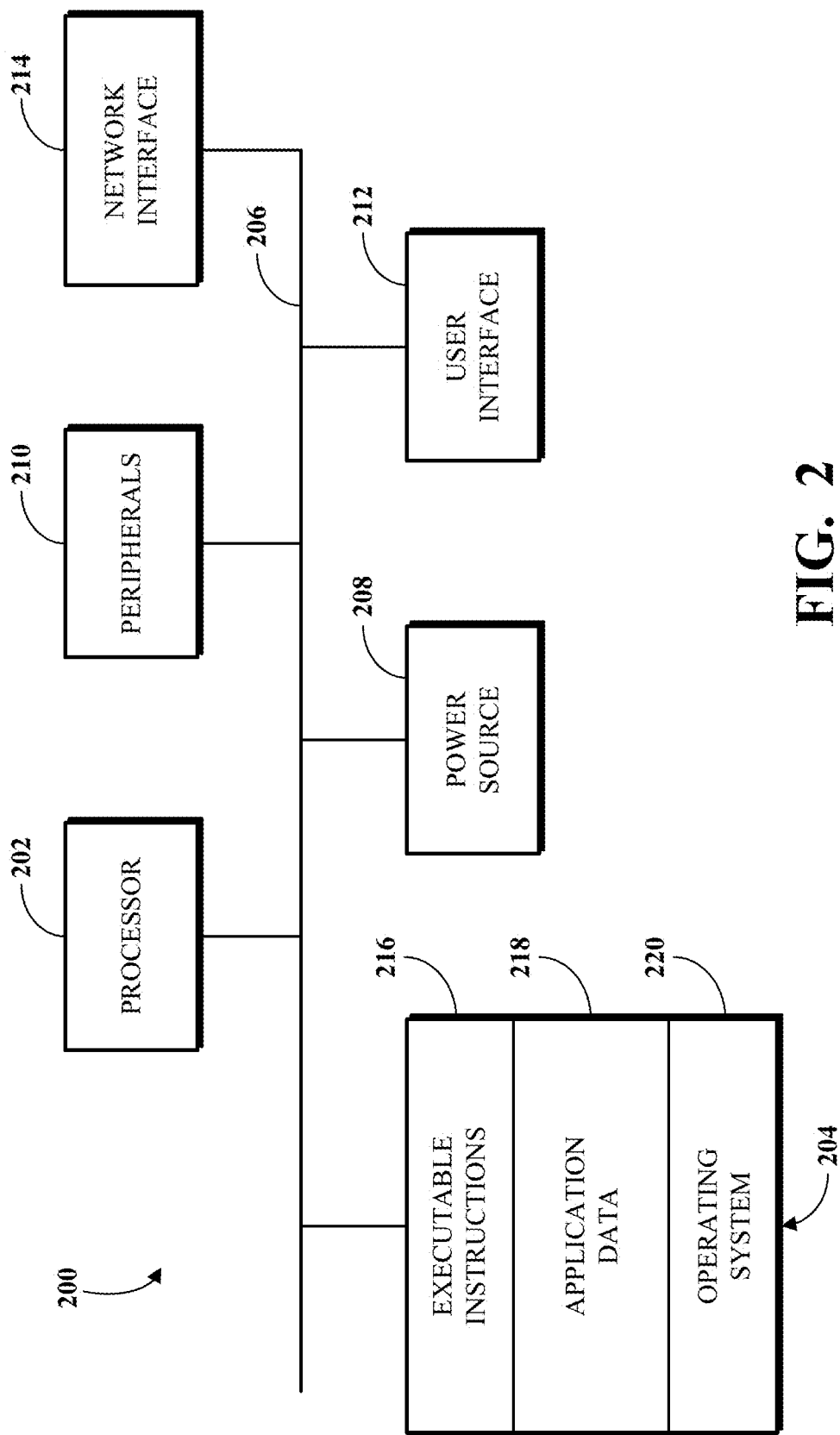
FIG. 2 is a block diagram of an example internal configuration of a computing device for facilitating configuration and deployment of a pipeline.

FIG. 2 is a block diagram of an example internal configuration of a computing device 200 for facilitating configuration and deployment of a pipeline. The computing device 200 may implement one or more of the configuration service 110, the design control system 120, the one or more data sources 130, the programming system 132, the target device 140, or the field system 150 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a dynamic random access memory (DRAM) module, such as double data rate (DDR) synchronous DRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220, when present, can be, for example, Microsoft Windows®, Mac OS X®, or Linux®; an operating system for a mobile device, such as a smartphone or tablet device; or an operating system for a non-mobile device, such as a mainframe computer. For example, a target device that is an embedded device might not have an operating system.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 102 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
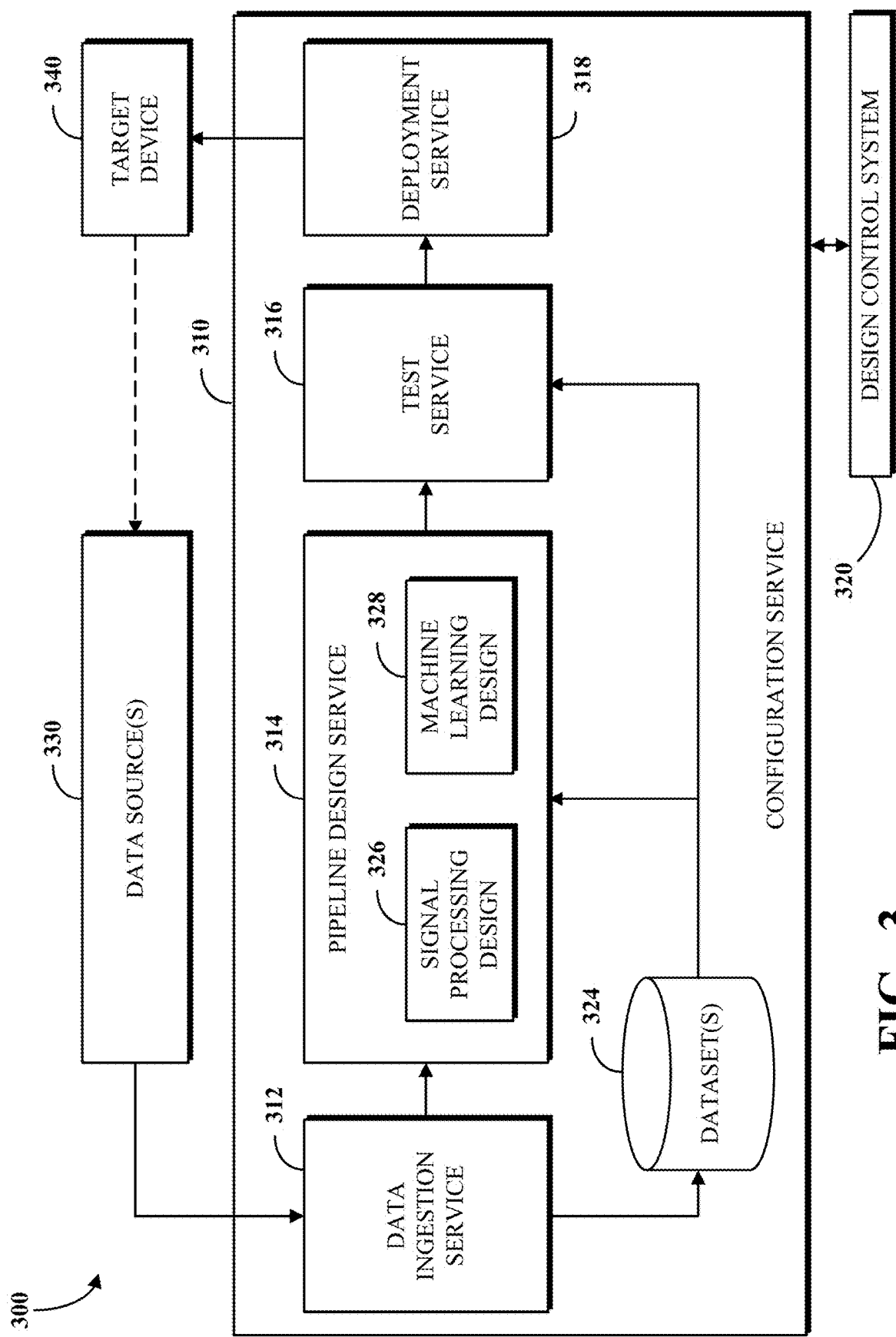
FIG. 3 is a block diagram of an example of a system for configuring a pipeline including a signal processing component and a machine learning component.

FIG. 3 is a block diagram of an example of a system 300 for configuring a pipeline including a signal processing component and a machine learning component. The system 300 may include a configuration service 310, a design control system 320, one or more data sources 330, and a target device 340 like the configuration service 110, the design control system 120, the one or more data sources 130, and the target device 140 shown in FIG. 1, respectively.

The configuration service 310 may be a software platform instantiated using one or more servers at one or more datacenters. The configuration service 310 may include a data ingestion service 312, a pipeline design service 314, a test service 316, and a deployment service 318. The data ingestion service 312 may receive input data from the one or more data sources 330. The input data may be used by the configuration service 310 to generate one or more datasets that may be used to configure, train, and/or test a configuration of the pipeline. The one or more datasets may be stored by the configuration service 310 in a database 324. The one or more data sources 330 could be selected and/or configured by the user via the design control system 320. The one or more data sources 330 could also be configured by the configuration service 310, such as for transferring the input data from the one or more data sources 330 to the configuration service 310. The one or more data sources 330 may include, for example, one or more servers, computers, mobile phones, or other electronic devices, such as microcontrollers or boards.

The pipeline design service 314 may be used to configure one or more configurations of a pipeline (e.g., a machine learning pipeline or impulse) to be implemented on the target device 340 (e.g., a specified microcontroller, board, computer, or mobile phone). The pipeline design service 314 may utilize a signal processing design service 326 and/or a machine learning design service 328 to configure a configuration of the pipeline. The signal processing design service 326 may be used to configure one or more signal processing components (e.g., one or more components implementing a DSP algorithm) for the pipeline. The machine learning design service 328 may be used to configure one or more machine learning components (e.g., one or more components implementing conditional logic, a neural network, a heuristic algorithm, or other learning algorithm, such as a classifier) for the pipeline. The signal processing components and the machine learning components may be connected to one another in various ways by the pipeline design service 314 (e.g., in series or in parallel). In one example, a signal processing component may be arranged in a first stage to pre-process data, followed by a machine learning component arranged in a second stage in series to process data. In another example, a first signal processing component may be arranged in a first stage to pre-process data, followed by a second signal processing component arranged in a second stage in series to further pre-process data, followed by a machine learning component arranged in a third stage in series to process data (e.g., multiple signal processing components). In another example, a signal processing component may be arranged in a first stage to pre-process data, followed by a first machine learning component arranged in a second stage in series to process data, followed by a second machine learning component arranged in a third stage in series to post-process data (e.g., multiple machine learning components). In some cases, the one or more signal processing components and/or the one or more machine learning components may be connected in parallel. For example, in a first stage, a first signal processing component may pre-process data in a first path and a second signal processing component may pre-process data in a second path, in a second stage, a first machine learning component may process data from the first signal processing component in the first path and a second machine learning component may process data from the second signal processing component in the second path, and in a third stage, a third machine learning component may post-process data from the first machine learning component and the second machine learning component in the second stage. Thus, the pipeline design service 314 may permit one or more signal processing components and one or more machine learning components to be connected to one another in various ways.

Various parameters may be used to configure a configuration of the pipeline. The signal processing design service 326 may determine the parameters for configuring the one or more signal processing components, and the machine learning design service 328 may determine the parameters for configuring the one or more machine learning components. Examples of parameters for configuring a processing component may include selection of a DSP algorithm (e.g., Mel-filterbank energy (MFE), Mel frequency cepstral coefficients (MFCC), or spectrogram), frame length, frame stride, frequency bands, and normalization or noise floor. Examples of parameters for configuring a machine learning component may include selection of a learning process (e.g., conditional logic, neural network, heuristic algorithm, or other learning algorithm, such as a classifier), and hyperparameters, such as number of training cycles, learning rate, validation set size, neural network topology, neural network size, types of layers, and order of layers. For example, parameters for a neural network may configure layers as dense, 1D convolution, or 2D convolution, and/or to reshape, flatten, and/or dropout. In some implementations, the pipeline design service 314 (e.g., the signal processing design service 326 and/or the machine learning design service 328) may determine the parameters based on user input of parameters, the target device 340, an application constraint (e.g., a targeted latency, accuracy, memory usage, and/or energy usage), and/or datasets stored in the database 324. One or more of the user input of parameters, the target device 340, the application constraint, and/or the datasets may be indicated by input from a user, such as via the design control system 320. One or more parameters may be specified and/or modified by a user, such as via the design control system 320.

The test service 316 may be used to test the one or more configurations of the pipeline. In some implementations, the test service 316 may use data from datasets stored in the database 324 to test the or more configurations of the pipeline to generate feedback. For example, the test service 316 may test the one or more configurations with respect to latency (e.g., inference time), level of accuracy of predictions, memory usage (e.g., RAM and/or ROM), and/or energy usage (e.g., power consumption). The test service 316 may provide such feedback to a user, via the design control system 320, so that the user may accept or change a configuration of the pipeline based on the testing. In some implementations, the test service 316 may use the feedback to identify one or more parts of the configuration of the pipeline (e.g., a signal processing component or a machine learning component) to change.

The deployment service 318 may be used to deploy a configuration of the pipeline to the target device 340. The target device 340 may be indicated by a user via the design control system 320. In some implementations, the target device 340 may be indicated by a selection of the target device 340 from a library of multiple possible target devices. The target device 340 could be, for example, a device (e.g., a microcontroller or board), a computer, or a mobile phone. In some implementations, the target device 340 could comprise a system running in a cloud server. The deployment service 318 may utilize a software toolchain, specific to the target device 340, for generating software and/or firmware for deploying the configuration of the pipeline to the target device 340. For example, a software toolchain may include a set of programming tools (e.g., a compiler, linker, libraries, and debugger) provided by a manufacturer or vendor for programming a particular device, library, computer, or mobile phone.

In some implementations, the deployment service 318 may communicate with a programming system (e.g., the programming system 132) to send the software and/or firmware to the programming system for programming the target device 340. For example, the deployment service 318 may generate a binary that may be used to flash, or program the ROM, of a device corresponding to the target device 340. Thus, the target device 340, when programmed, may implement a configuration of the pipeline that may be used for machine learning on a target having constraints, such as in a field system like the field system 150 shown in FIG. 1. For example, the target device 340 could be an embedded device that implements embedded machine learning in the field system 150.

Thus, there may be different ways a pipeline may be configured on the target device 340. Additionally, there may be constraints associated with the target device 340, such as memory usage (e.g., RAM and/or ROM availability by the target device 340) and/or energy usage (e.g., power limitations of the target device 340), and constraints associated with application of the target device 340 in the field, such as latency (e.g., inference time) and/or level of accuracy (e.g., predictions). Further, target devices may differ from one another with respect to implementing the pipeline (e.g., the software toolchains involved to implement a configuration of the pipeline on a target device may differ), with more complex target devices sometimes involving a more complex implementation. Further, target devices may differ from one another with respect to performance (e.g., some target devices may inherently perform better than others, such as devices having more execution units and higher clock frequencies performing better than devices having fewer execution units and lower clock frequencies).

Implementations of this disclosure permit automatically determining the performances of multiple configurations of a pipeline for implementation on the target device 340. The configuration service 310 may receive input, such as selection of the target device 340, selection of application constraints (e.g., a targeted latency, accuracy, memory usage, and/or energy usage), selection of one or more data sources 330, selection of input data, and/or selection of one or more parameters. The input may be provided by a user via the design control system 320. The configuration service 310 may execute to generate multiple configurations of a pipeline based on the input (e.g., selection of the target device 340, the application constraints, the input data, and/or the one or more parameters). The multiple configurations may vary in the parameters that are used, including parameters that may be specified by the user, and therefore may vary in configurations of the one or more signal processing components (e.g., configured by the signal processing design service 326) and/or the one or more machine learning components (e.g., configured by the machine learning design service 328). Thus, the performance of a first configuration of the pipeline that may be implemented on the target device 340 may vary from the performance of a second configuration of the pipeline of the pipeline that may be implemented on the target device 340. The configuration service 310 may execute to determine the performances of the multiple configurations of the pipeline that it determines based on the input (e.g., selection of the target device 340, the application constraints, the input data, and/or the one or more parameters). The performances of the multiple configurations may be determined, for example, by calculating latencies (e.g., inference times), memory usage (e.g., RAM and/or ROM usage), energy usage (e.g., power consumption), and/or levels of accuracy associated with the configurations when implemented on the target device 340.

In some implementations, the performance of a configuration may be determined by simulating the target device 340 implementing the configuration. This may permit determining the performance based on characteristics of the target device 340, such as the particular architecture implemented by the target device 340. For example, simulating the target device 340 may include executing compiled code (e.g., computer instructions) implementing the pipeline on a virtual version of the target device 340. In some implementations, the performance of a configuration may be determined by referencing one or more benchmarks associated with the target device 340 (e.g., predetermined performance data from a look up table or other data structure) and applying the one or more benchmarks to estimate the performance of the configuration when the target device 340 implements the configuration. In some cases, a machine learning model or heuristic algorithm may be used to predict the performance of the configuration based on the one or more benchmarks. This may permit determining the performance more quickly when using benchmarks. In some implementations, the configurations may be ranked based on their performances with their relative rankings displayed to a GUI. In some implementations, the performance of a configuration may be compared to an application constraint (e.g., a targeted latency, accuracy, memory usage, and/or energy usage) indicated by an input and displayed to a GUI. In some implementations, a configuration may be selected, based on the configuration satisfying the application constraint, for implementing the configuration on the target device 340 (e.g., a microcontroller or board implementing a given architecture). In some implementations, the configuration may be implemented on the target device 340 by utilizing a software toolchain for the target device 340, such as for generating software and/or firmware that is specific to the target device 340. In some implementations, implementing the configuration on the target device 340 may include determining portions of the pipeline to be implemented on various cores of a heterogenous device (e.g., a device including multiple types of processors and instruction sets), and may include distributing a computational workload associated with the pipeline across the various cores. In some implementations, a GUI may be used when configuring the pipeline, such as a GUI displayed to a user via the design control system 320.

Figure 4:
FIG. 4 is an illustration of an example of a graphical user interface (GUI) indicating data acquired from data source(s).

FIG. 4 is an illustration of an example of a GUI 400 indicating data acquired from data source(s) (e.g., the one or more data sources 330). The GUI 400 could be output for display at a user interface like the user interface 212 shown in FIG. 2. For example, the GUI 400 could be output for display to a user at the design control system 320 shown in FIG. 3. The information associated with the GUI 400 may be accessible via an API.

The GUI 400 may indicate data acquired, by the data ingestion service 312, from the one or more data sources 330 shown in FIG. 3. The data acquired (or "collected data") may comprise input data with associated labels for machine learning. For example, the collected data may include audio files that are labeled "faucet" or "noise" for training a configuration of the pipeline to classify a sound as either "faucet," indicating a sound of water running from a faucet, or "noise," indicating a sound other than water running from a faucet. The input data may be processed by the data ingestion service 312 and stored as one or more datasets in the database 324. The data ingestion service 312 may split the input data into a first amount for training the pipeline (e.g., 87%) and a second amount for testing the pipeline (e.g., 13%). In some implementations, the data ingestion service 312 may determine a default for the train/test split, and a user may change the default via the design control system 320.

Figure 5:
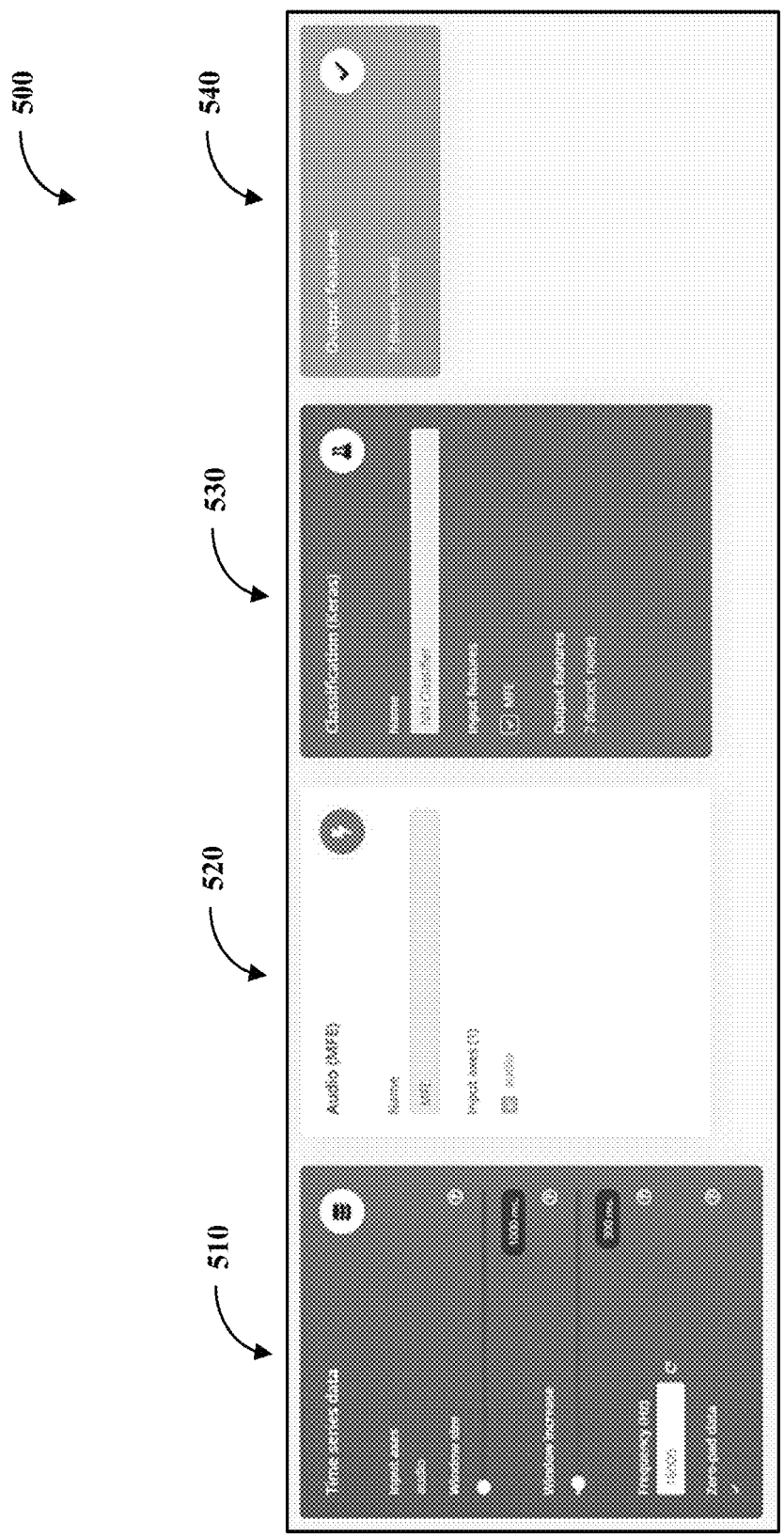
FIG. 5 is an illustration of an example of a GUI indicating configuration of a pipeline.

FIG. 5 is an illustration of an example of a GUI 500 indicating a configuration of a pipeline. The GUI 500 could be output for display at a user interface like the user interface 212 shown in FIG. 2. For example, the GUI 500 could be output for display to a user at a design control system like the design control system 320 shown in FIG. 3. The GUI 500 may be used to configure a pipeline (e.g., an impulse) for implementation on a target device (e.g., the target device 340). The information associated with the GUI 500 may be accessible via an API.

An input block 510 may indicate an input configuration, based on parameters, of the input data (e.g., images or time series, such as audio, vibration, or movements) from the one or more data sources (e.g., the one or more data sources 330). The input data may be processed by the data ingestion service 312, to produce one or more datasets, according to the input configuration (e.g., input axes for listing each axis referenced from the training dataset, window size defining the size of the raw features used for the training, window increase to extract multiple overlapping windows from a single sample, and frequency for sampling data). In some implementations, the data ingestion service 312 may determine a default for the input configuration, and the default may be modified by a user via the input block 510. A signal processing block 520 may indicate a signal processing configuration, based on parameters, for the signal processing design service 326. The signal processing configuration may be used by the signal processing design service 326 to generate the one or more signal processing components. In some implementations, the signal processing block 520 may determine a default for the signal processing configuration, and the default may be modified by a user via the signal processing block 520. A machine learning block 530 may indicate a machine learning configuration, based on parameters, for the machine learning design service 328. The machine learning configuration may be used by the machine learning design service 328 to generate the one or more machine learning components. In some implementations, the machine learning design service 328 may determine a default for the machine learning configuration, and the default may be modified by a user via the machine learning block 530. An output block 540 may indicate an output configuration, based on parameters, for the output of the pipeline (e.g., output data, such as classifying a data sample as "faucet," indicating a sound of water running from a faucet, or "noise," indicating a sound other than water running from a faucet). In some implementations, the pipeline design service 314 may determine a default for the output configuration, and the default may be modified by a user via the output block 540.

The GUI 500 may permit one or more signal processing components (e.g., via the signal processing block 520) and the machine learning components (e.g., via the machine learning block 530) to be connected to one another in various ways (e.g., in series or in parallel). In one example, a signal processing component may be arranged in a first stage to pre-process data, followed by a machine learning component arranged in a second stage in series to process data. In another example, a first signal processing component may be arranged in a first stage to pre-process data, followed by a second signal processing component arranged in a second stage in series to further pre-process data, followed by a machine learning component arranged in a third stage in series to process data (e.g., multiple signal processing components). In another example, a signal processing component may be arranged in a first stage to pre-process data, followed by a first machine learning component arranged in a second stage in series to process data, followed by a second machine learning component arranged in a third stage in series to post-process data (e.g., multiple machine learning components). In some cases, the one or more signal processing components and/or the one or more machine learning components may be connected in parallel. For example, in a first stage, a first signal processing component may pre-process data in a first path and a second signal processing component may pre-process data in a second path, in a second stage, a first machine learning component may process data from the first signal processing component in the first path and a second machine learning component may process data from the second signal processing component in the second path, and in a third stage, a third machine learning component may post-process data from the first machine learning component and the second machine learning component in the second stage. Thus, the GUI 500 (e.g., via the pipeline design service 314) may permit one or more signal processing components and one or more machine learning components to be connected to one another in various ways.

Figure 6:
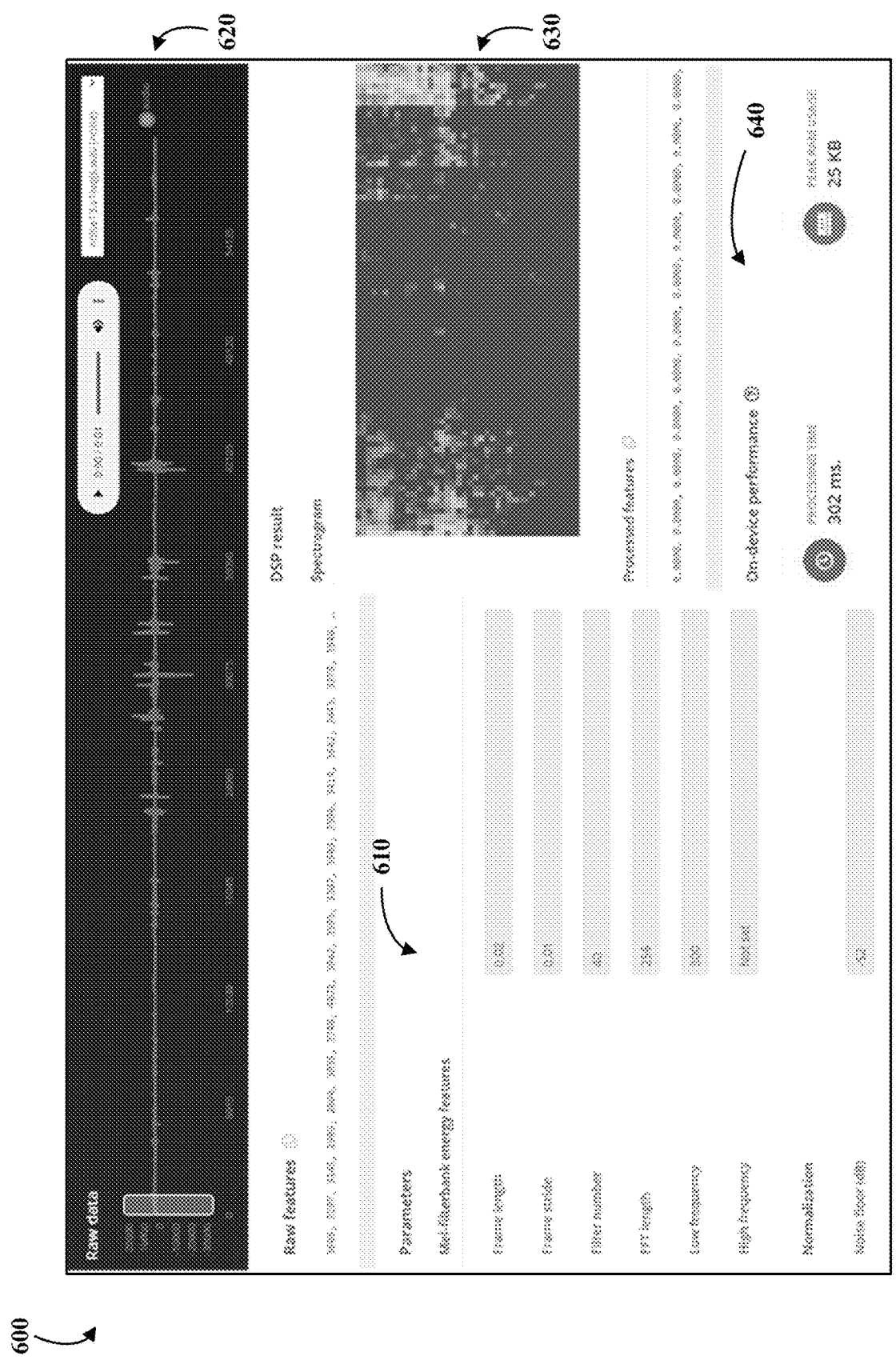
FIG. 6 is an illustration of an example of a GUI indicating configuration of a signal processing component of a pipeline.

FIG. 6 is an illustration of an example of a GUI 600 indicating a configuration, based on parameters, of a signal processing component of a pipeline. The GUI 600 could be output for display at a user interface like the user interface 212 shown in FIG. 2. For example, the GUI 600 could be output for display to a user at a design control system like the design control system 320 shown in FIG. 3. In some cases, selecting the signal processing block 520 shown in FIG. 5 may cause display of the GUI 600. The information associated with the GUI 600 may be accessible via an API The GUI 600 may include parameters 610 for the signal processing design service 326 to generate one or more signal processing components. The parameters 610 may permit selections of a DSP algorithm (e.g., MFE, MFCC, or spectrogram), frame length, frame stride, frequency bands, filter number, fast Fourier transform (FFT) length, low frequency, high frequency, and normalization or noise floor. The signal processing design service 326 may generate a signal processing component based on the parameters 610. A user may change one or more of the parameters 610 in the GUI 600, such as via the design control system 320.

To assist in the configuration, the GUI 600 may permit review of input data (e.g., processed by the data ingestion service 312), and features associated with the input data, via a waveform 620. The GUI 600 may also permit review of signal processing results (e.g., pre-processed data), from the signal processing component as configured, via a signal processing map 630. The GUI 600 may also indicate performance 640 (e.g., processing time and peak memory usage, such as RAM) of the signal processing component as configured. For example, the performance 640 may be determined by the signal processing design service 326, based on input (e.g., selection of the target device 340, the application constraints, the input data, and/or the one or more parameters), via simulations and/or benchmarks.

Figure 7:
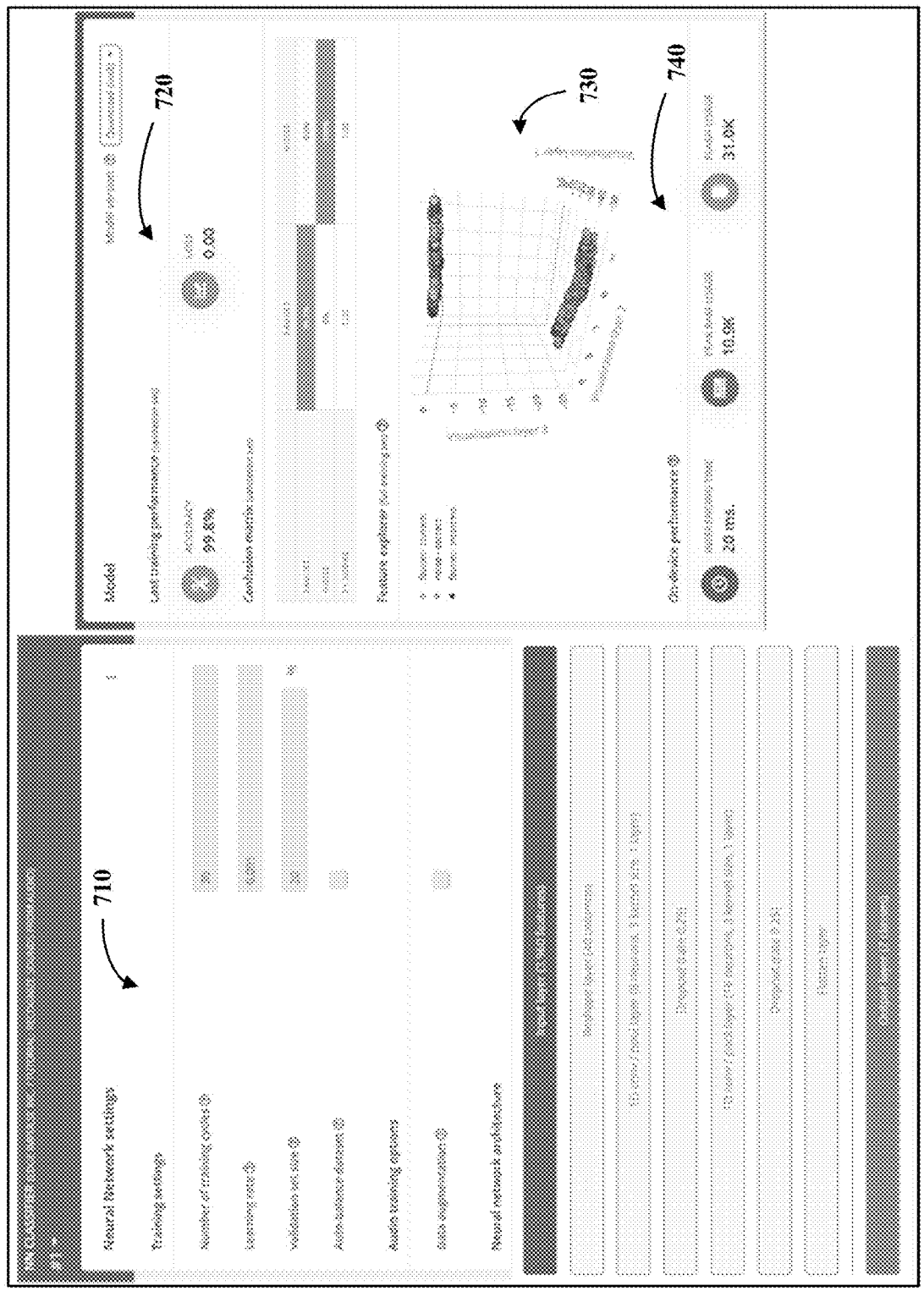
FIG. 7 is an illustration of an example of a GUI indicating configuration of a machine learning component of a pipeline.

FIG. 7 is an illustration of an example of a GUI 700 indicating a configuration, based on parameters, of a machine learning component of a pipeline. The GUI 700 could be output for display at a user interface like the user interface 212 shown in FIG. 2. For example, the GUI 700 could be output for display to a user at a design control system like the design control system 320 shown in FIG. 3. In some cases, selecting the machine learning block 530 shown in FIG. 5 may cause display of the GUI 700. The information associated with the GUI 700 may be accessible via an API The GUI 700 may include parameters 710 for the machine learning design service 328 to generate one or more machine learning components. The parameters 710 may permit selections of a learning process (e.g., conditional logic, neural network, heuristic algorithm, or other learning algorithm, such as a classifier), and hyperparameters, such as number of training cycles, learning rate, validation set size, neural network topology, neural network size, types of layers, and order of layers. The machine learning design service 328 may generate a machine learning component based on the parameters 710. A user may change one or more of the parameters 710 in the GUI 700, such as via the design control system 320.

To assist in the configuration, the GUI 700 may permit review of machine learning results 720 (e.g., processed data), from the machine learning component as configured, such as by displaying a determined level of accuracy, a confusion matrix, and a machine learning map 730. The GUI 700 may also indicate performance 740 (e.g., inference time and peak memory usage, such as ROM and/or RAM) of the machine learning component as configured. For example, the performance 740 may be determined by the machine learning design service 328, based on input (e.g., selection of the target device 340, the application constraints, the input data, and/or the one or more parameters), via simulations and/or benchmarks.

Figure 8:
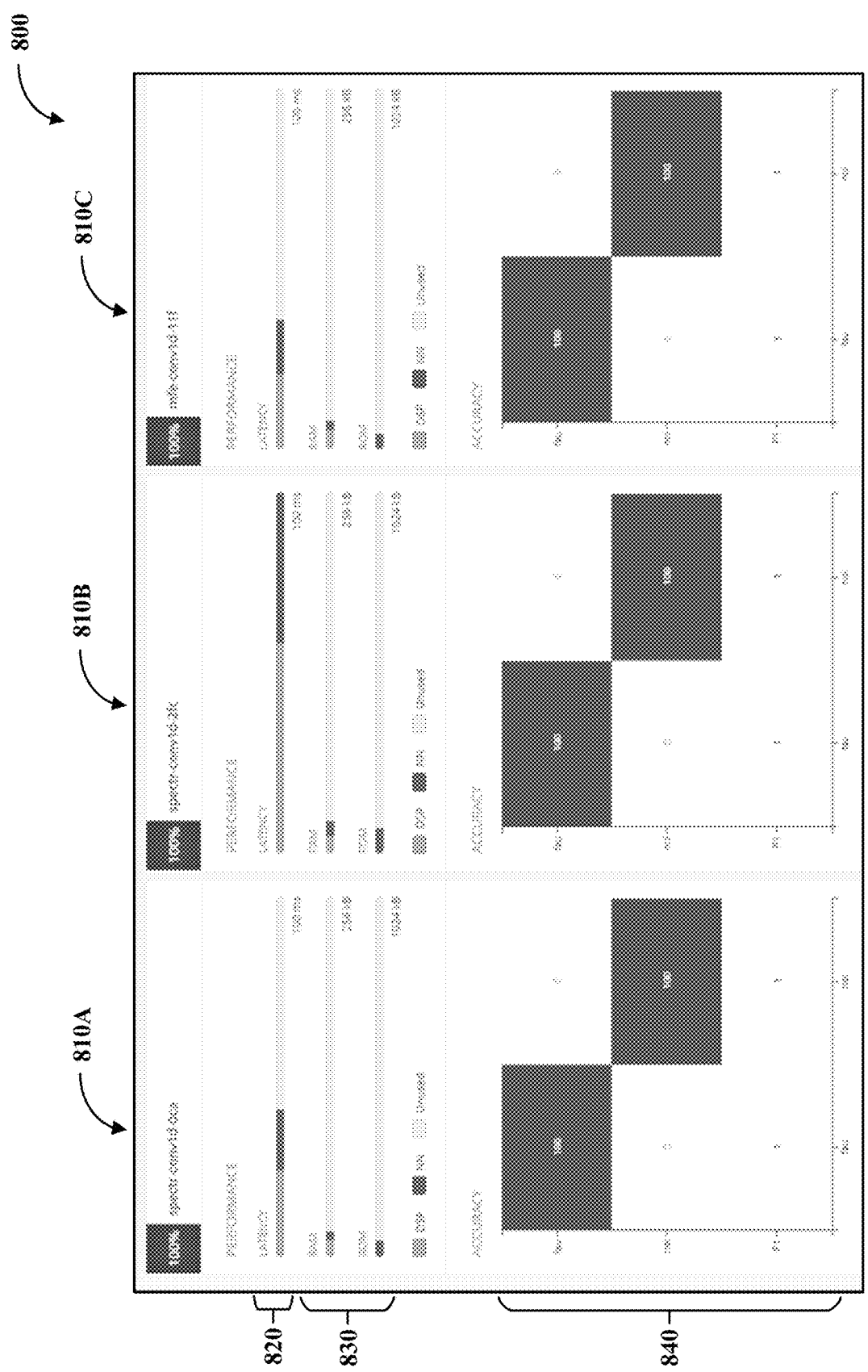
FIG. 8 is an illustration of an example of a GUI indicating performances of multiple configurations of a pipeline.

FIG. 8 is an illustration of an example of a GUI 800 indicating performances of multiple configurations of a pipeline. The GUI 800 could be output for display at a user interface like the user interface 212 shown in FIG. 2. For example, the GUI 800 could be output for display to a user at a design control system like the design control system 320 shown in FIG. 3. The information associated with the GUI 800 may be accessible via an API.

The GUI 800 may indicate performances, such as performances 810A through 810C. The performances 810A through 810C may be associated with varying configurations of the pipeline (e.g., varying based on parameters). For example, the performance 810A may be associated with a first configuration of the pipeline (e.g., a configuration of the pipeline including a signal processing component with a spectrogram algorithm and a machine learning component with a neural network having two 1D convolution layers and data augmentation); the performance 810B may be associated with a second configuration of the pipeline (e.g., a configuration of the pipeline including a signal processing component with a spectrogram algorithm and a machine learning component with a neural network having four 1D convolution layers and no data augmentation); and the performance 810C may be associated with a third configuration of the pipeline (e.g., a configuration of the pipeline including a signal processing component with an MFE algorithm and a machine learning component with a neural network having three 1D convolution layers and data augmentation). The performances 810A through 810C may be determined by the pipeline design service 314, including based on input from user (e.g., selection of the target device 340, the application constraints, the input data, and/or the one or more parameters), such as via simulation or benchmarks.

Each of the performances 810A through 810C may indicate a latency 820 (e.g., an inference time), a memory usage 830 (e.g., a RAM usage and a ROM usage), and a level of accuracy 840, for their respective configurations when implemented on the target device 340. In some implementations, the performances 810A through 810C may also indicate an energy usage when implemented on the target device 340. In some implementations, the performances 810A through 810C (e.g., the latency 820, the memory usage 830, the energy usage, or the accuracy 840) of the configurations may be determined by simulating the target device 340 implementing each of the configurations (e.g., determining the performances based on characteristics of the target device 340, such as the architecture of a device). In some implementations, the performances 810A through 810C of the configurations may be determined by referencing one or more benchmarks associated with the target device 340 (e.g., predetermined performance data from a look up table or other data structure) and applying the one or more benchmarks to estimate the performance of each configuration when implemented on the target device 340. In some cases, a machine learning model or heuristic algorithm may be used to predict the performance of a configuration based on the one or more benchmarks. This may permit determining performances more quickly when using benchmarks. In some implementations, the configurations may be ranked based on their performances (e.g., indicating a configuration with a higher level of accuracy before indicating a configuration with a lower level of accuracy). In some implementations, the performances 810A through 810C may be compared to an application constraint (e.g., a targeted latency, accuracy, memory usage, and/or energy usage) indicated by the input.

Figure 9:
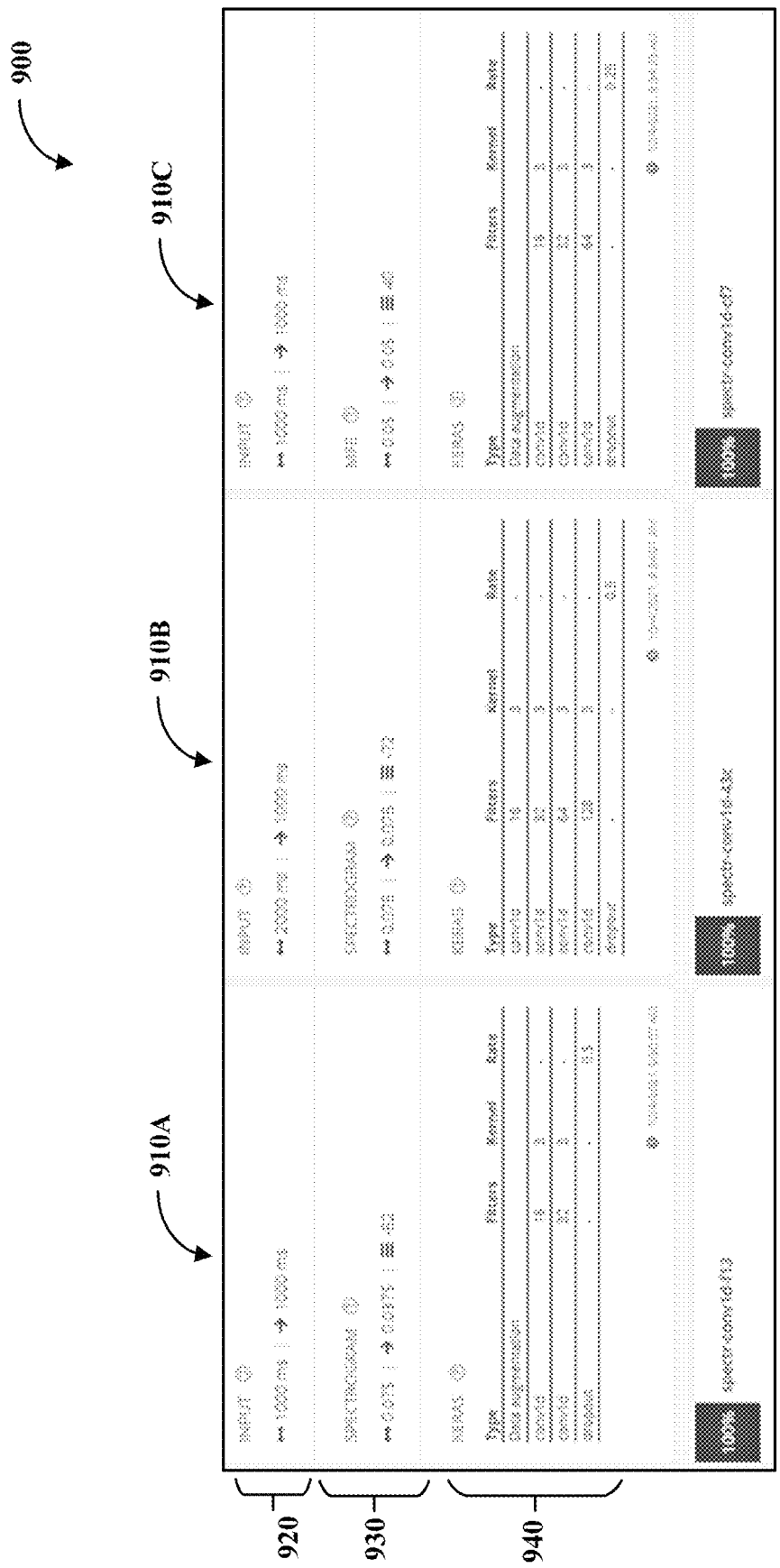
FIG. 9 is an illustration of an example of a GUI indicating multiple configurations of a pipeline.

FIG. 9 is an illustration of an example of a GUI 900 indicating multiple configurations of a pipeline. The GUI 900 could be output for display at a user interface like the user interface 212 shown in FIG. 2. For example, the GUI 900 could be output for display to a user at a design control system like the design control system 320 shown in FIG. 3. The information associated with the GUI 900 may be accessible via an API.

The GUI 900 may indicate multiple configurations of a pipeline, such as configurations 910A through 910C. The configurations 910A through 910C may vary based on parameters and may be associated with varying performances of the pipeline, such the performances 810A through 810C. For example, the configuration 910A (e.g., a configuration of the pipeline including a signal processing component with a spectrogram algorithm and a machine learning component with a neural network having two 1D convolution layers and data augmentation) may be associated with the performance 810A; the configuration 910B (e.g., a configuration of the pipeline including a signal processing component with a spectrogram algorithm and a machine learning component with a neural network having four 1D convolution layers and no data augmentation) may be associated with the performance 810B; and the configuration 910C (e.g., a configuration of the pipeline including a signal processing component with an MFE algorithm and a machine learning component with a neural network having three 1D convolution layers and data augmentation) may be associated with the performance 810C. The configurations 910A through 910C may be determined by the pipeline design service 314, including based on input from a user (e.g., selection of the target device 340, the application constraints, the input data, and/or the one or more parameters). For example, the configurations 910A through 910C may be determined by the signal processing design service 326 and the machine learning design service 328. In some implementations, the GUI 900 and the GUI 800 may be displayed in a combined GUI that indicates the relationships between the performances 810A through 810C and, correspondingly, the configurations 910A through 910C.

Each of the configurations 910A through 910C may include indication of an input configuration 920, a signal processing configuration 930, and a machine learning configuration 940. The input configuration 920 may be based on parameters for the input data used by the data ingestion service 312. The signal processing configuration 930 may be based on parameters for the signal processing component used by the signal processing design service 326. The machine learning configuration 940 may be based on parameters for the machine learning component used by the machine learning design service 328.

Figure 10:
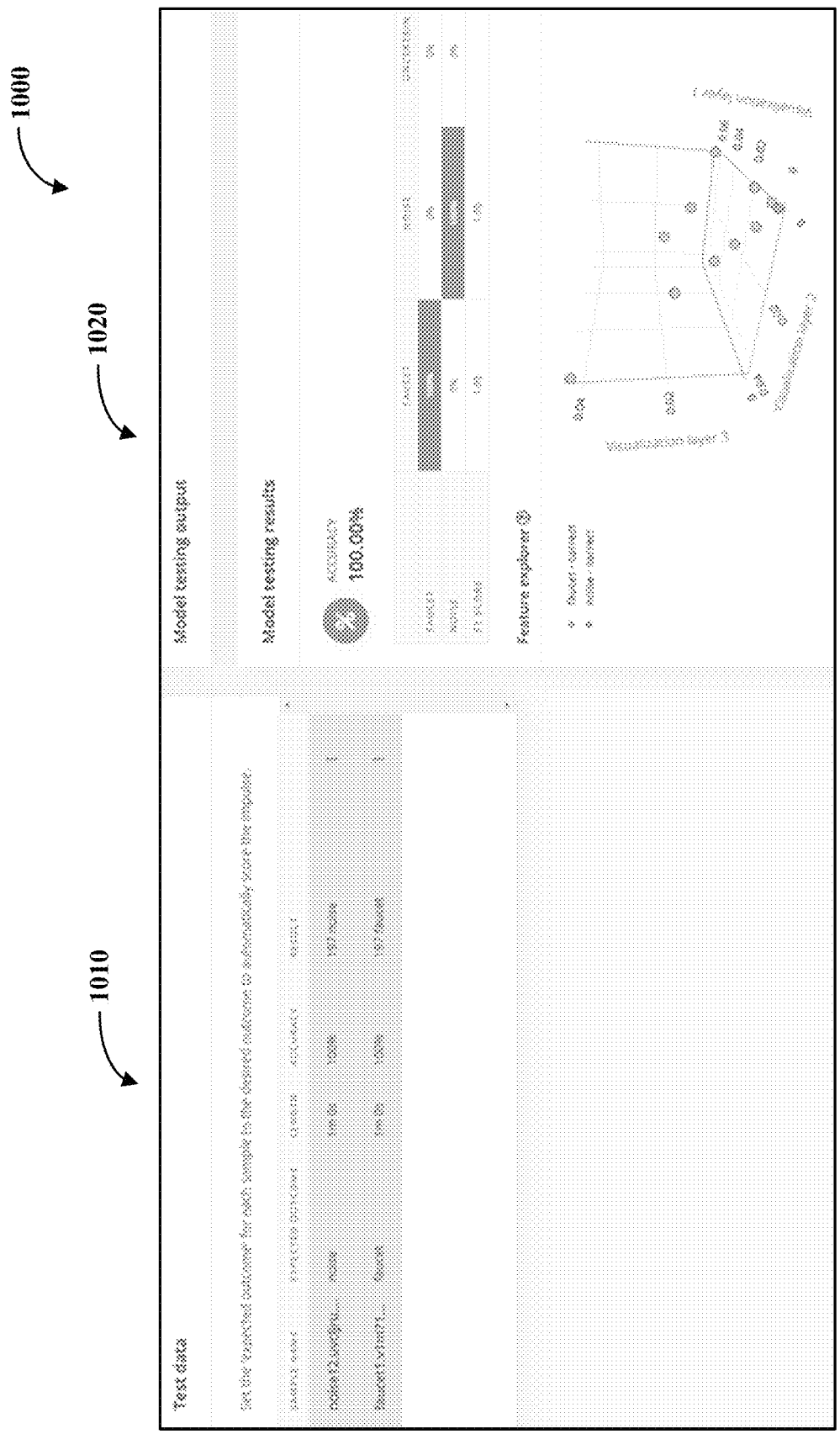
FIG. 10 is an illustration of an example of a GUI indicating testing of a configuration of a pipeline.

FIG. 10 is an illustration of an example of a GUI 1000 indicating testing of a configuration of a pipeline. The GUI 1000 could be output for display at a user interface like the user interface 212 shown in FIG. 2. For example, the GUI 1000 could be output for display to a user at a design control system like the design control system 320 shown in FIG. 3. The information associated with the GUI 800 may be accessible via an API.

The GUI 1000 may indicate test data 1010 used by the test service 316 for a configuration of the pipeline. For example, the test service 316 may use data from datasets stored in the database 324 to test the or more configurations of the pipeline. In one example, the test service 316 may test the one or more configurations of the pipeline with respect to a level of accuracy of predictions. The test service 316 may provide a testing output 1020 to a user, via the design control system 320, so that the user may accept or change a configuration of the pipeline based on the testing. The testing output 1020 may include, for example, a determined level of accuracy and a machine learning map. For example, the testing output 1020 may indicate the test service 316 has determined a level of accuracy of 100% for predictions based on the test data (e.g., classifying a data sample as "faucet," indicating a sound of water running from a faucet, or "noise," indicating a sound other than water running from a faucet).

Figure 11:
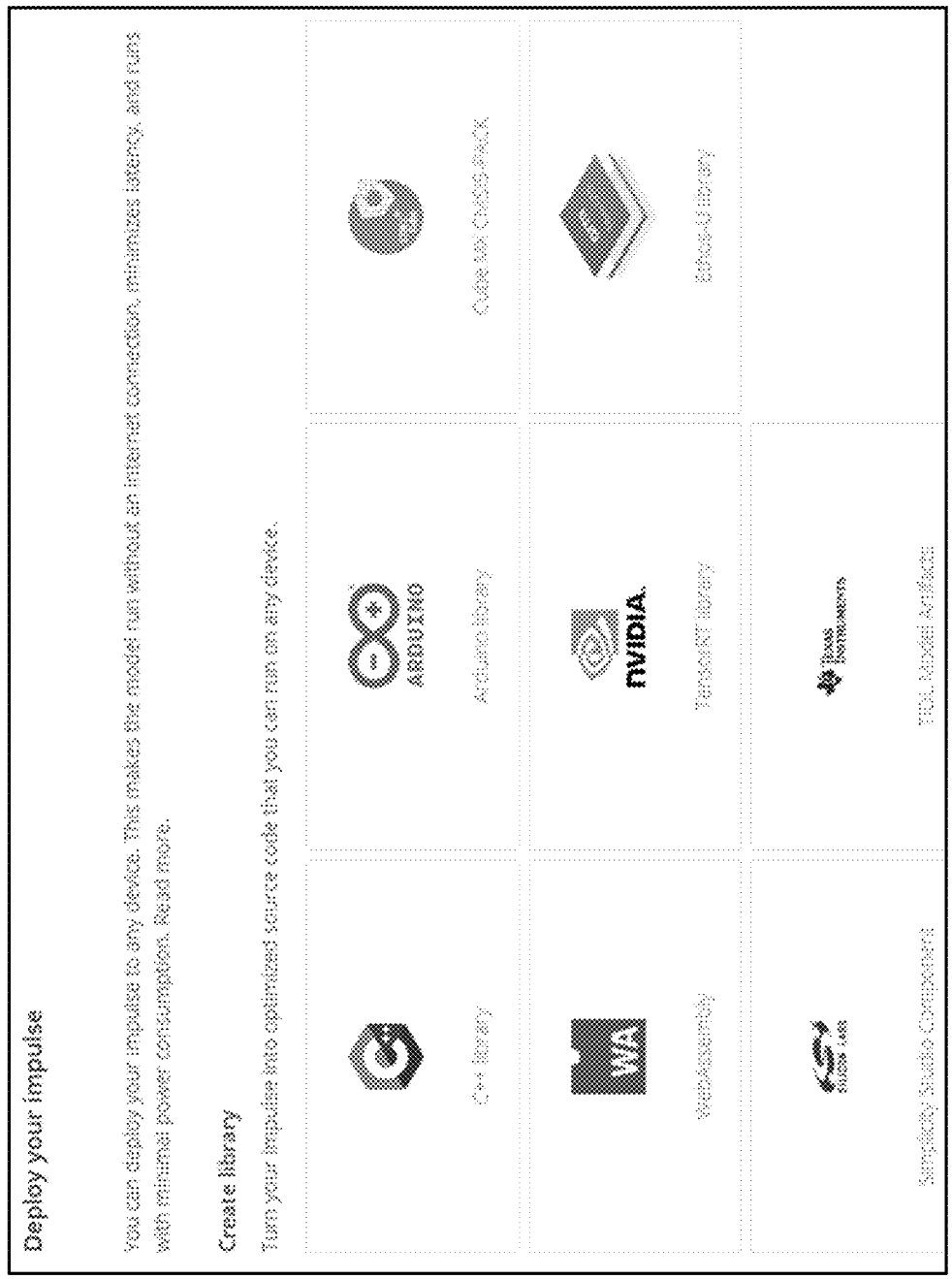
FIG. 11 is an illustration of an example of a GUI indicating deployment of a configuration of a pipeline to a library.

FIG. 11 is an illustration of an example of a GUI 1100 indicating deployment of a configuration of a pipeline to a library. A computer or other device (e.g., the target device 340) may use the library to implement a configuration of the pipeline. The GUI 1100 could be output for display at a user interface like the user interface 212 shown in FIG. 2. For example, the GUI 1100 could be output for display to a user at a design control system like the design control system 320 shown in FIG. 3. The information associated with the GUI 1100 may be accessible via an API.

The GUI 1100 may indicate multiple possible targets that are libraries. For example, possible libraries could include: a C++ library, Arduino library, Cube.MX CMSIS-PACK, WebAssembly, TensorRT library, Ethos-U library, and Simplicity Studio Component. A user may provide input (e.g., via the design control system 320) to select a library as a target. The deployment service 318 may receive the input and may utilize a software toolchain, specific to the library that is selected, for generating software for deploying a configuration of the pipeline to the library. For example, the deployment service 318 may include a compiler for generating compiled code targeting the library that is selected. A computer or other device (e.g., the target device 340) may use the library to implement a configuration of the pipeline.

Figure 12:
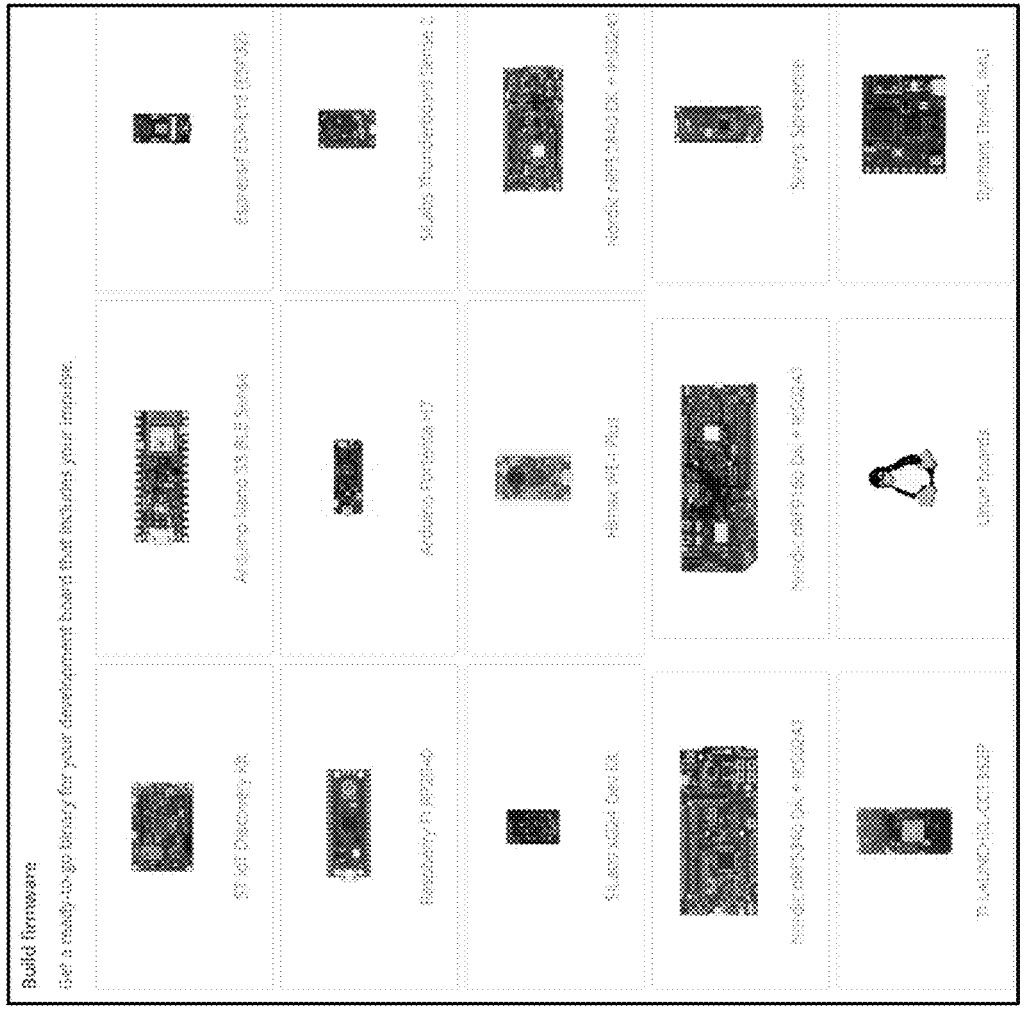
FIG. 12 is an illustration of an example of a GUI indicating deployment of a configuration of a pipeline to a device.

FIG. 12 is an illustration of an example of a GUI 1200 indicating deployment of a configuration of a pipeline to a device (e.g., the target device 340). The GUI 1200 could be output for display at a user interface like the user interface 212 shown in FIG. 2. For example, the GUI 1200 could be output for display to a user at a design control system like the design control system 320 shown in FIG. 3. The information associated with the GUI 1200 may be accessible via an API.

The GUI 1200 may indicate multiple possible target devices comprising microcontrollers or boards in a library. For example, possible target devices in the library could include: an ST IoT Discovery Kit, Arduino Nano 33 BLE Sense, Espressif ESP-EYE (SEP32), Raspberry Pi RP2040, Arduino Portenta H7, SiLabs Thunderboard Sense 2, SiLabs xG24 Dev Kit, Himax WE-I Plus, Nordic nRF52840 DK+IKS02A1, Nordic nRF5340 DK+IKS02A1, Nordic nRF9160 DK+IKS02A1, Nordic Thingy:53, Sony's Spresense, TI LAUNCHXL-CC1352P, and Linux Boards. A user may provide input (e.g., via the design control system 320) to select a microcontroller or board as a target device (e.g., the target device 340). The deployment service 318 may receive the input and may utilize a software toolchain, specific to the microcontroller or board that is selected, for generating software and/or firmware for deploying a configuration of the pipeline to the microcontroller or board. For example, the deployment service 318 may include a compiler for generating compiled code targeting the microcontroller or board that is selected, including software and/or firmware. In some implementations, the deployment service 318 may communicate with a programming system (e.g., the programming system 132) to send the software and/or firmware to a programming system for programming the microcontroller or board (e.g., programming a flash memory or ROM of the microcontroller).

Figure 13:
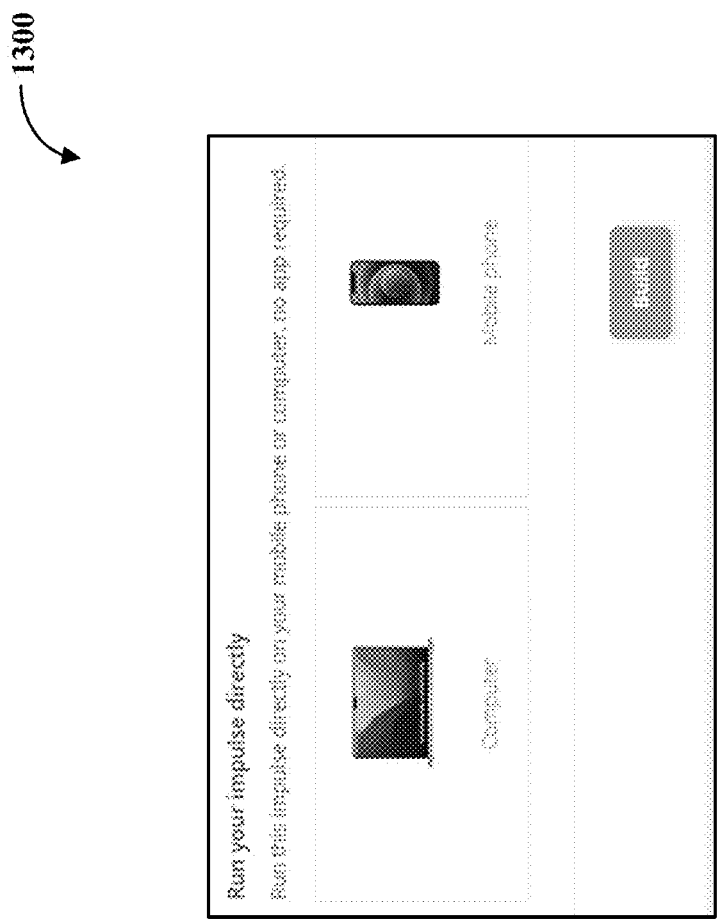
FIG. 13 is an illustration of an example of a GUI indicating deployment of a configuration of a pipeline to a computer or a mobile phone.

FIG. 13 is an illustration of an example of a GUI 1300 indicating deployment of a configuration of a pipeline to a computer or a mobile phone (e.g., the target device 340). The GUI 1300 could be output for display at a user interface like the user interface 212 shown in FIG. 2. For example, the GUI 1300 could be output for display to a user at a design control system like the design control system 320 shown in FIG. 3. The information associated with the GUI 1300 may be accessible via an API.

The GUI 1300 may indicate multiple possible target devices comprising computers or mobile phones in a library. A user may provide input (e.g., via the design control system 320) to select a computer or a mobile phone as a target device (e.g., the target device 340). The deployment service 318 may receive the input and may utilize a software toolchain, specific to the computer or the mobile phone that is selected, for generating software for deploying a configuration of the pipeline to the computer or the mobile phone.

For example, the deployment service 318 may include a compiler for generating compiled code targeting the computer or the mobile phone that is selected. In some implementations, the deployment service 318 may communicate with the computer or the mobile phone (e.g., via the network 102) to send the software and/or firmware to the computer or the mobile phone, for the computer or the mobile phone to execute, for implementing the pipeline.

Figure 14:
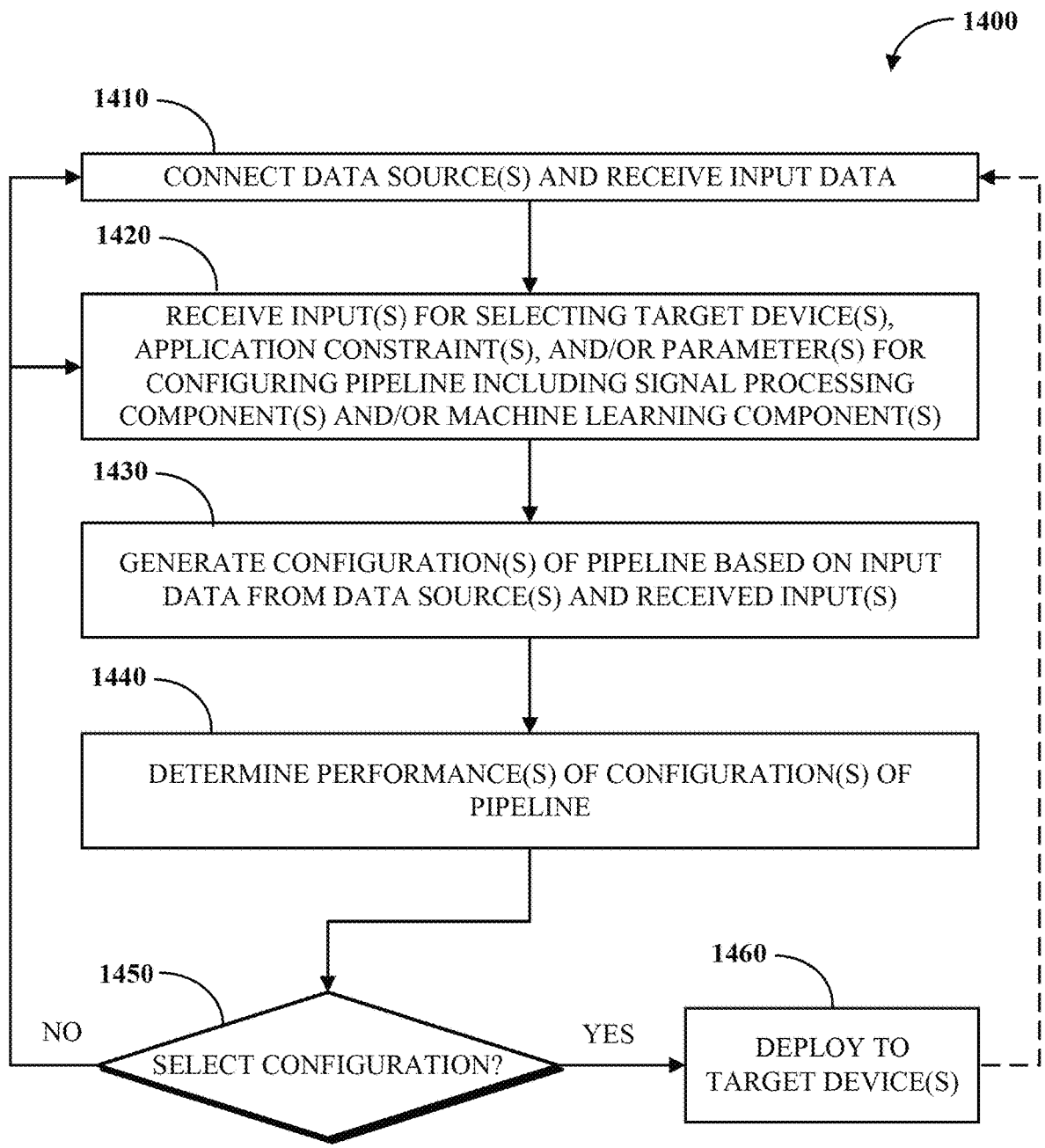
FIG. 14 is a flow chart of an example of a process for configuring a pipeline including a signal processing component and a machine learning component.

To further describe some implementations in greater detail, reference is next made to examples of techniques which may be performed when configuring a pipeline that includes a signal processing component and a machine learning component. FIG. 14 is a flow chart of an example of a technique 1400 for configuring a pipeline that includes a signal processing component and a machine learning component. The technique 1400 can be executed using computing devices, such as the systems, hardware, and software described with respect to FIGS. 1-13. The technique 1400 can be performed, for example, by executing a machine-readable program or other computer-executable instructions, such as routines, instructions, programs, or other code. The steps, or operations, of the technique 1400 or another technique, method, process, or algorithm described in connection with the implementations disclosed herein can be implemented directly in hardware, firmware, software executed by hardware, circuitry, or a combination thereof.

For simplicity of explanation, the technique 1400 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1410, a configuration service (e.g., the configuration service 310) may connect to one or more data sources (e.g., the one or more data sources 330). The configuration service may receive input data, from the one or more data sources, via a data ingestion service (e.g., data ingestion service 312). The data ingestion service that process the input data to generate one or more datasets that may be used to configure, train, and/or test a configuration of the pipeline. The input data may be processed according to a configuration, based on parameters, such as input axes for listing each axis referenced from the training dataset, window size defining the size of the raw features used for the training, window increase to extract multiple overlapping windows from a single sample, and frequency for sampling data. The one or more datasets may be stored by the configuration service in a database (e.g., the database 324). The one or more data sources could be selected and/or configured by a user via a design control system (e.g., the design control system 320). The one or more data sources could also be configured by the configuration service, such as for transferring the input data from the one or more data sources to the configuration service. The one or more data sources may include, for example, one or more servers, computers, mobile phones, or other electronic devices, such as microcontrollers or boards.

At 1420, the configuration service may receive one or more inputs, such as from a user via the design control system. The one or more inputs may include selection of a target device (e.g., the target device 340) from multiple possible target devices, including a microcontroller or board, a computer, or a mobile phone. The one or more inputs may also include an indication of one or more application constraints (e.g., a targeted latency, accuracy, memory usage, and/or energy usage). The one or more inputs may also include input data. The one or more inputs may also include an indication of one or more parameters, and/or a modification of one or more parameters determined by the configuration service, for configuring a pipeline that includes a signal processing component and a machine learning component. For example, the one or more parameters may be used to configure a signal processing component (e.g., settings that affect signal processing calculations, such as a particular DSP algorithm or noise floor) and/or a machine learning component (e.g., settings that affect machine learning, such as hyperparameters including neural network topology, size, or training) of the pipeline.

At 1430, the configuration service may generate multiple configurations of a pipeline based on the one or more inputs (e.g., the target device, the application constraints, the input data, and/or the one or more parameters). For example, a pipeline design service (e.g., the pipeline design service 314) of the configuration service may invoke a signal processing design service (e.g., the signal processing design service 326) and a machine learning design service (e.g., the machine learning design service 328) to generate the multiple configurations of the pipeline. For example, the configuration service may generate multiple configurations like the configurations 910A through 910C shown in FIG. 9.

At 1440, the configuration service may determine the performances of the multiple configurations of the pipeline. For example, the configuration service may determine the performances of the multiple configurations like the performances 810A through 810C shown in FIG. 8. In some implementations, the performance (e.g., the latency, the memory usage, the energy usage, or the accuracy) of a configuration may be determined by simulating the target device implementing the configuration (e.g., determining the performance based on characteristics of the target device, such as the architecture of a microcontroller or board, a computer, or a mobile phone. In some implementations, the performance of a configuration may be determined by referencing one or more benchmarks associated with the target device (e.g., predetermined performance data from a look up table or other data structure) and applying the one or more benchmarks to estimate the performance of the configuration when the target device implements the configuration. In some cases, a machine learning model or heuristic algorithm may be used to predict the performance of the configuration based on the one or more benchmarks. This may permit determining the performance more quickly when using benchmarks. In some implementations, the configurations may be ranked based on their performances. In some implementations, the performance of a configuration may be compared to an application constraint (e.g., a targeted latency, accuracy, memory usage, and/or energy usage) indicated by an input.

At 1450, the configuration service may determine whether a configuration of the multiple configurations is selected. A configuration may be selected, for example, by a user providing input via the design control system. In some implementations, a configuration may be automatically selected, such as when a configuration is determined to satisfy the application constraint. For example, a configuration may be automatically selected based on a rank of the configuration (e.g., a highest ranking accuracy and/or inference time, while satisfying the targeted memory usage and/or energy usage). If a configuration is not selected ("No"), the technique may repeat, such as by returning to 1410 (e.g., to connect another data source and/or receive additional input data) or 1420 (e.g., to receive additional inputs, or changes to inputs). If a configuration is selected ("Yes"), the technique may continue at 1460 in which the configuration may be deployed to the target device. In some implementations, the configuration may be implemented on a target device by utilizing a software toolchain for the target device, such as for generating firmware. In some implementations, implementing the configuration on a target device may include determining portions of the pipeline to be implemented on various cores of a heterogenous device, and distributing a computational workload associated with the pipeline across the various cores. In some implementations, the target device may be implemented in a field system (e.g., the field system 150), and in some cases, the target device may be used to provide input data to the configuration service as a data source, such as for testing the target device when it is implemented and/or implementing a next target device (e.g., a second target device).

As a result, a pipeline including one or more signal processing components and one or more machine learning components may be determined for an application and/or a device while reducing the time and/or the burden associated with making the determination. Further, the pipeline may be implemented on a target device while reducing the time and/or the burden associated with utilizing the software toolchain for the target device. Additionally, by determining configurations that include signal processing and machine learning components, trade-offs between signal processing efficiency (e.g., utilization of the signal processing component) and machine learning efficiency (e.g., utilization of the machine learning component) may be achieved.

Figure 15:
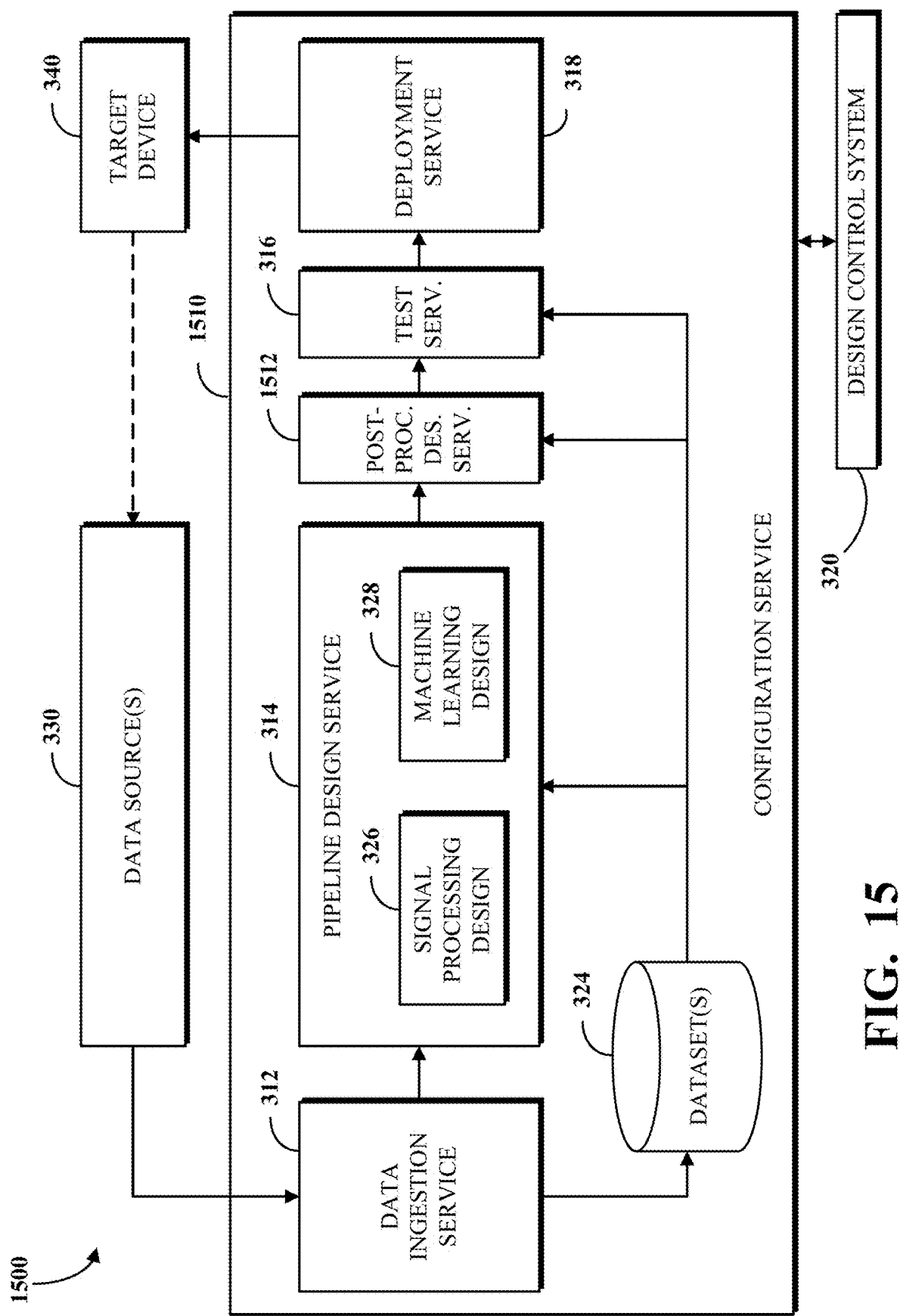
FIG. 15 is a block diagram of an example of a system for determining a post-processing configuration for post-processing output data from a pipeline.

FIG. 15 is a block diagram of an example of a system 1500 for determining a post-processing configuration for post-processing output data from a pipeline. The system 1500 may include a configuration service 1510, which may be like the configuration service 310 shown in FIG. 3, including with the data ingestion service 312, the pipeline design service 314, the test service 316, and the deployment service 318, and the database 324. The configuration service 1510 may also include a post-processing design service 1512 (e.g., a performance calibration service). The system 1500 may also include the design control system 320, the one or more data sources 330, and the target device 340, as described in FIG. 3.

The post-processing design service 1512 may be arranged between the pipeline design service 314 and the test service 316. The post-processing design service 1512 may be used to configure one or more post-processing configurations (e.g., a post-processing algorithm, or post-processing stage) for post-processing output data from a configuration of a pipeline (e.g., the machine learning pipeline or impulse, generated by the pipeline design service 314). For example, the configuration of the pipeline, and the one or more post-processing configurations, could be implemented on the target device 340 (e.g., a specified microcontroller, board, computer, or mobile phone).

Figure 16:
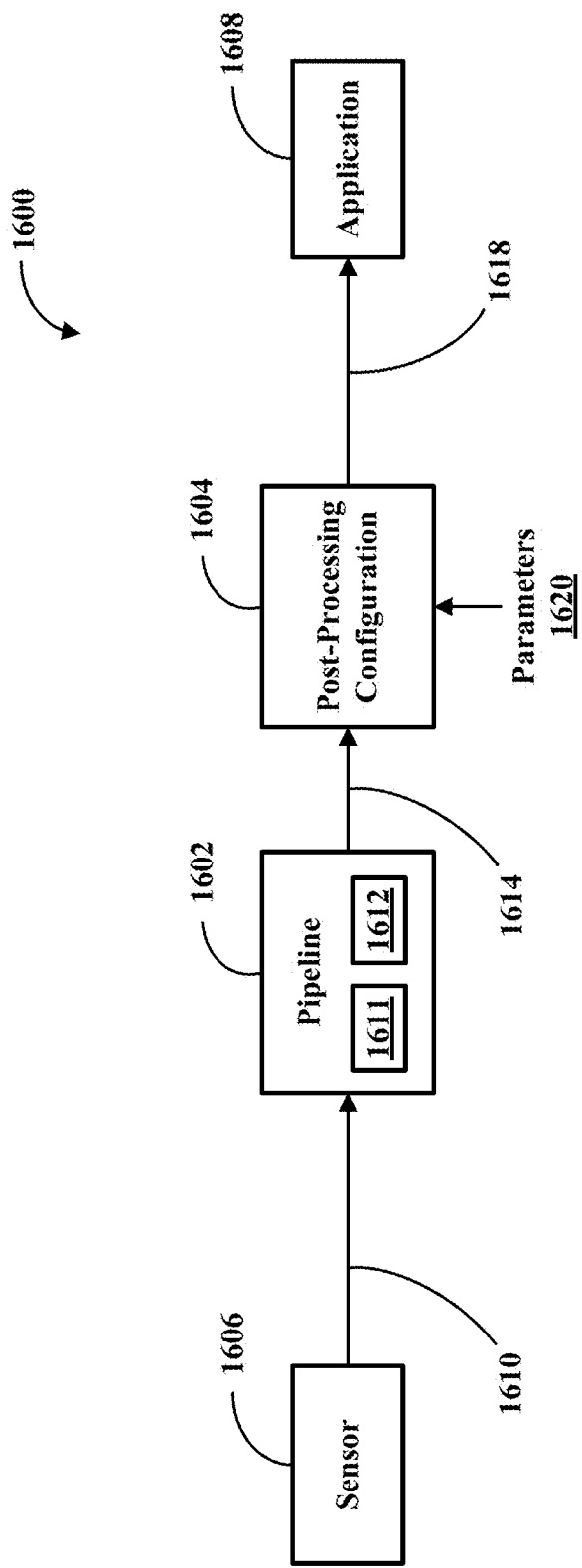
FIG. 16 is a block diagram of an example of a system including a post-processing configuration.

The post-processing design service 1512 may configure a post-processing configuration to generate a detectable event based on detections in the output data from a configuration of the pipeline. For example, with additional reference to FIG. 16, a block diagram of an example of a system 1600 including a configuration of a pipeline 1602 and a post-processing configuration 1604 is provided. The system 1600 could be implemented on a target device, such as an embedded device that implements embedded machine learning, a microcontroller, or other constrained device which may be limited by power, processing speed, and/or memory. For example, the system 1600 could be implemented by the target device 140 shown in FIG. 1, or the target device 340 shown in FIG. 3. In addition to the pipeline 1602 and the post-processing configuration 1604, the system 1600 may include a sensor 1606 and an application 1608. The sensor 1606 may be configured to sense an environmental condition and generate input data 1610 for the pipeline 1602, such as time series sensor data in response to the environmental condition. For example, the sensor 1606 could be a microphone configured to generate audio data in real time, such as from a person speaking. The pipeline 1602 may receive the input data 1610, which could be in a first stream. The application 1608 could include hardware, software, and/or firmware associated that uses the pipeline 1602 to help guide decisions in a field system (e.g., the field system 150).

The pipeline 1602 may be configured by the pipeline design service 314 for the target device. For example, the pipeline 1602 may include a signal processing component 1611 and a machine learning component 1612. The signal processing component 1611 could be configured by the signal processing design service 326, and the machine learning component 1612 could be configured by the machine learning design service 328. The pipeline 1602 may generate output data 1614 (e.g., a raw output from the model), which could be in a second stream based on the input data 1610. For example, the output data 1614 may indicate detections in the second stream based on the input data 1610 in the first stream. For example, the pipeline 1602 could implement a sound classifier configured to detect the utterances of keywords in audio data from a microphone, such as "yes" or "no," and the output data 1614 may indicate detections of the keywords.

Figure 17:
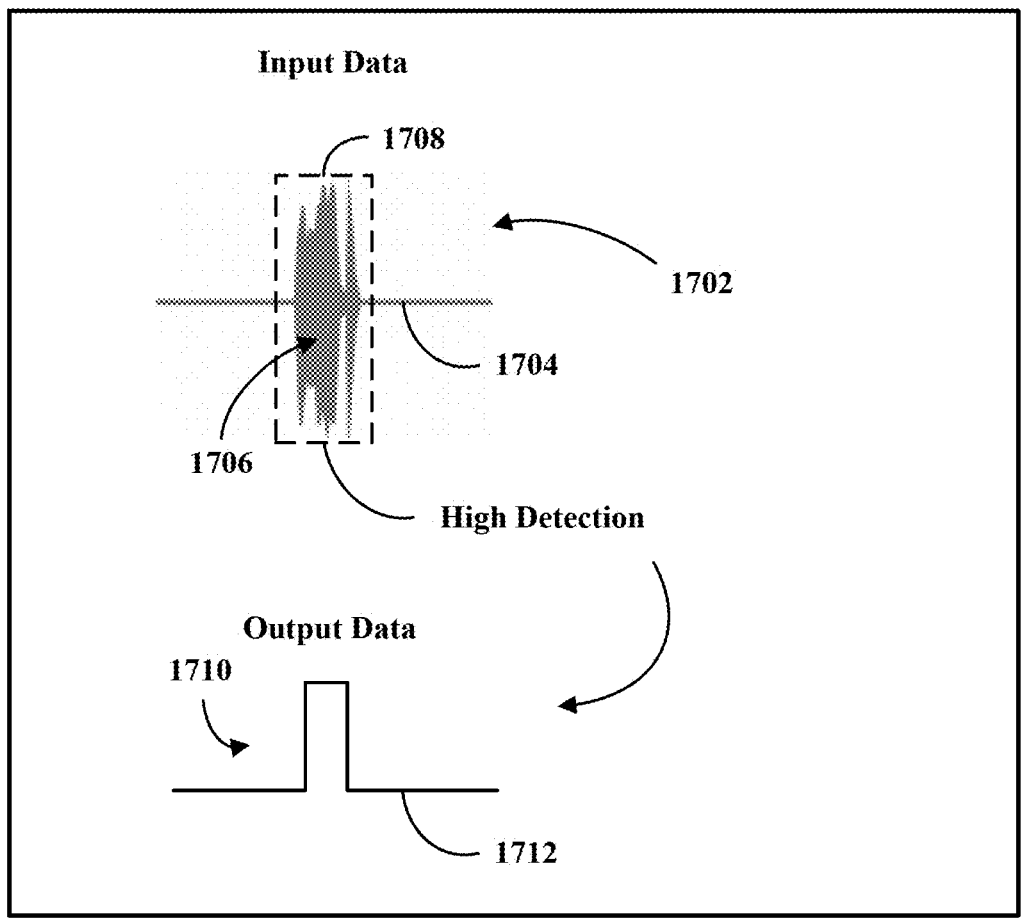
FIG. 17 is a block diagram of a first example of processing input data.

The post-processing configuration 1604 may receive the output data 1614. The post-processing configuration 1604 may be configured by the post-processing design service 1512 for the target device. The post-processing configuration 1604 could implement a post-processing algorithm, or post-processing stage, which is configured to generate detectable events 1618 based on the detections in the output data 1614. The post-processing configuration 1604 can apply parameters 1620 for post-processing the output data 1614 (e.g., the parameters 1620 may be calibrated to generate a usable output for application 1608). Based on the parameters 1620, the post-processing configuration 1604 can generate the detectable events 1618 for the application 1608. The parameters may control filtering and/or thresholding of the output data 1614. For example, with additional reference to FIG. 17, in a first example without post-processing, the pipeline 1602 might receive input data 1702 in a first stream 1704. The first stream 1704 may include a signal 1706. For example, the signal 1706 could correspond to the utterance of a keyword in audio data generated by a microphone, such as the word "yes." The pipeline 1602 could process the input data 1702 through a series of windows having a timed duration, such as a window 1708 having a one second duration. In the first example, the pipeline 1602 could generate output data 1710, in a second stream 1712, with a detection that classifies the contents of the window 1708 as containing the signal 1706 (e.g., corresponding to a single utterance of the keyword). The pipeline 1602 could classify the signal 1706 with high probability to generate the output data 1710 based on the timing of the window 1708 substantially capturing the signal 1706 in the first stream 1704.

Figure 18:
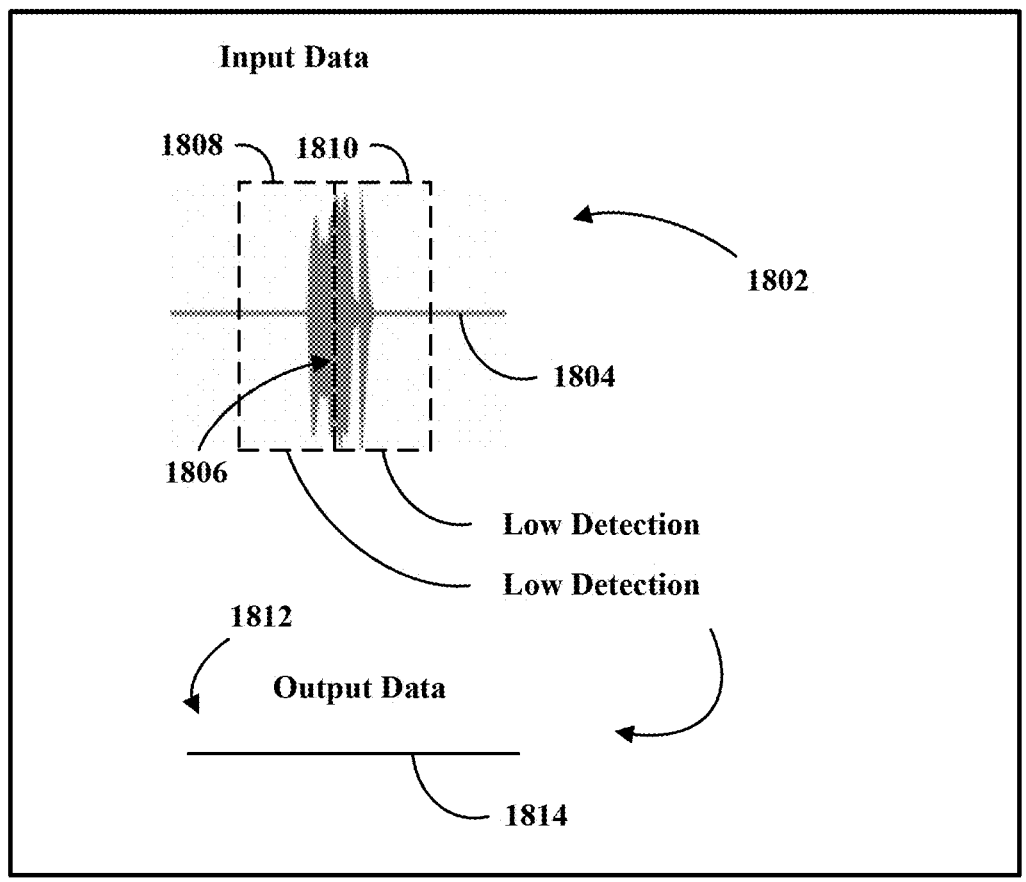
FIG. 18 is a block diagram of a second example of processing input data.

However, with additional reference to FIG. 18, in a second example without post-processing, the pipeline 1602 might receive input data 1802 in a first stream 1804. The first stream 1804 may include a signal 1806. For example, the signal 1806 could correspond to the utterance of a keyword in audio data generated by a microphone, such as the word "yes." The pipeline 1602 could process the input data 1802 through a series of windows having a timed duration, such as a first window 1808 and second window 1810, each having a one second duration. In the second example, the pipeline 1602 could generate output data 1812, in a second stream 1814, without any detections. For example, the pipeline 1602 might not classify the signal 1806 in the first stream 1804 due to a different timing of the windows (e.g., the first window 1808 and the second window 1810). For example, the first window 1808 might capture a first portion of the signal 1806, and the second window 1810 might capture a second portion of the signal 1806. The pipeline 1602 might not classify the contents of the first window 1808 as containing the signal 1806 corresponding to the keyword, and also might not classify the contents of the second window 1810 as containing the signal 1806 corresponding to the keyword. For example, the pipeline 1602 could indicate a low probability that the signal 1806 in the first window 1808 contains the keyword, and indicate a low probability that the signal 1806 in the second window 1810 contains the keyword, based on the timings of the first window 1808 and the second window 1810 (e.g., the first window 1808 and the second window 1810 each capturing only a limited portion of the signal 1806). Additionally, even if the pipeline 1602 could classify the contents of the first window 1808 as containing the signal 1806 corresponding to the keyword, and could classify the contents of the second window 1810 as containing the signal 1806 corresponding to the keyword, the result may be multiple indications of the keyword when the first stream 1804 only included one instance of the signal 1806 corresponding to the keyword.

Figure 19:
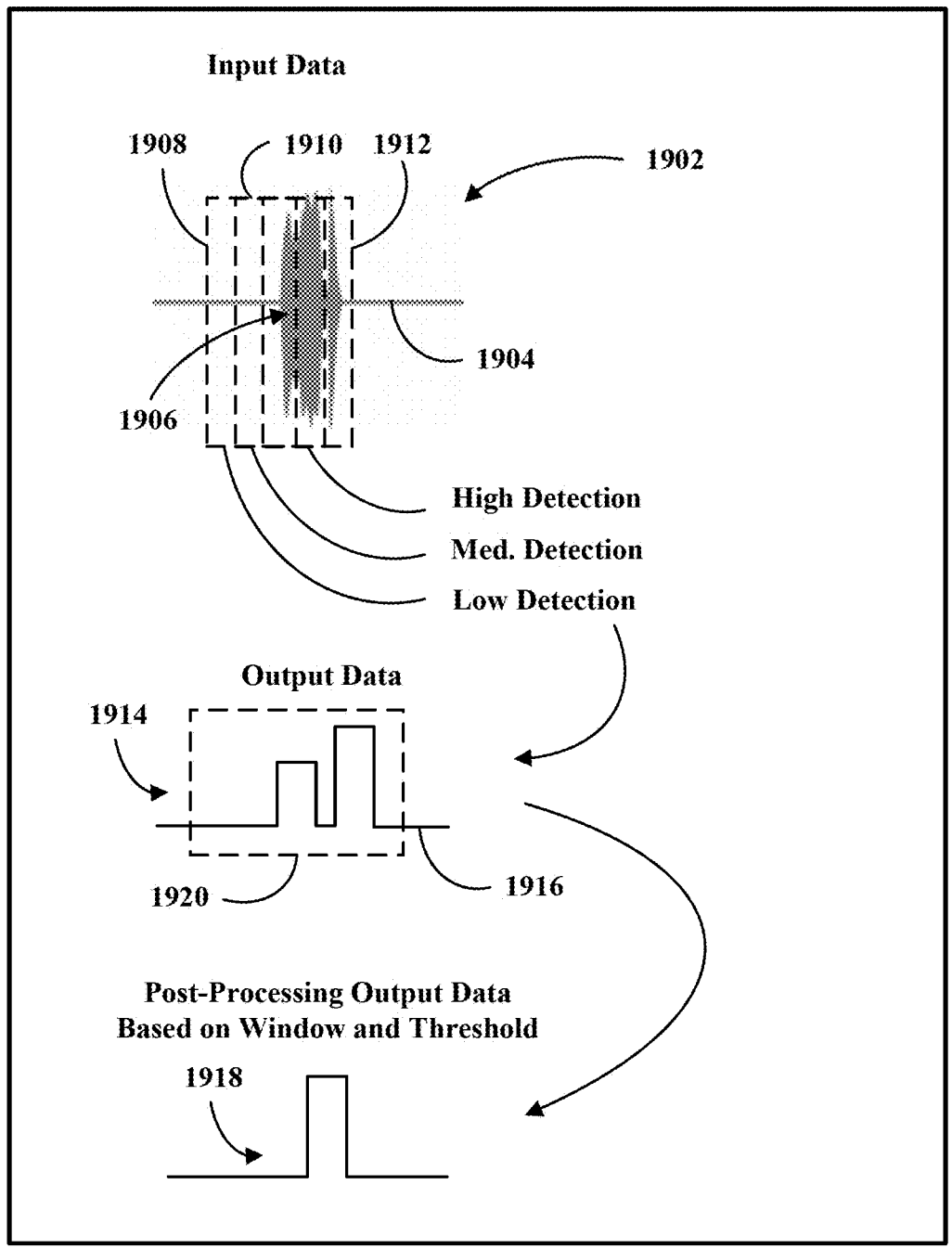
FIG. 19 is a block diagram of a third example of processing input data.

However, to improve performance, the post-processing configuration 1604 may be used. With additional reference to FIG. 19, in a third example with post-processing via the post-processing configuration 1604, the pipeline 1602 might receive input data 1902 in a first stream 1904. The first stream 1904 may include a signal 1906. For example, the signal 1906 could correspond to the utterance of a keyword in audio data generated by a microphone, such as the word "yes." The pipeline 1602 could process the input data 1902 through a series of overlapping windows having a timed duration and a timed offset, such as a first window 1908, a second window 1910, and a third window 1912, each having a one second duration, and each being offset from another, such as by 100 milliseconds. In the third example, the pipeline 1602 could generate output data 1914, in a second stream 1916, with mixed detections based on the signal 1906. For example, the first window 1908 might capture a first portion of the signal 1906, and the pipeline 1602 might not classify the contents of the first window 1908 as containing the signal 1906 corresponding to the keyword (e.g., a low level detection). The pipeline 1602 could indicate a low probability that the signal 1906 in the first window 1908 contains the keyword based on the timing of the first window 1908 (e.g., the first window 1908 capturing only a limited portion of the signal 1906). Further, the second window 1910 might capture the first portion of the signal 1906 and a second portion of the signal 1906, and the pipeline 1602 might classify the contents of the second window 1910 as more likely containing the signal 1906 corresponding to the keyword (e.g., a mid-level detection). The pipeline 1602 could indicate a medium probability that the signal 1906 in the second window 1910 contains the keyword based on the timing of the second window 1910 (e.g., the second window 1910 capturing more of the signal 1906). Further, the third window 1912 might substantially capture the signal 1906, including the first portion of the signal 1906, the second portion of the signal 1906, and a third portion of the signal 1906, and the pipeline 1602 might classify the contents of the third window 1912 as highly likely to contain the signal 1906 corresponding to the keyword (e.g., a high level detection, greater than the mid-level detection, in the second stream 1916). The pipeline 1602 could indicate a high probability that the signal 1906 in the third window 1912 contains the keyword based on the timing of the third window 1912 (e.g., the third window 1912 substantially capturing the signal 1906). The post-processing configuration 1604 may receive the output data 1914 in the second stream 1916, including the mixed detections based on the low, medium, and high probabilities. The post-processing configuration 1604 may generate a detectable event 1918 based on the detections in the output data 1914. For example, the post-processing configuration 1604 can generate the detectable event 1918 for the application 1608 to use in the field system.

Thus, the post-processing configuration 1604 can transform the second stream 1916 into a discrete detectable event (e.g., the detectable event 1918) that can be used by the application 1608. For example, the post-processing stage could average the output data 1914 (e.g., using an accumulation and averaging algorithm) so that the application can receive the detectable event 1918, as opposed to a series of detections in a stream (e.g., a low level, a mid-level, and a high level detections). The parameters 1620 can control the post-processing of the output data 1914 to generate detectable event 1918. In one example, the parameters 1620 can control filtering of the output data 1914, such as by changing an averaging window 1920 that averages the detections in the output data 1914 (e.g., including the low level, the mid-level, and the high level detections, or excluding one or more of them). In another example, the parameters 1620 can control thresholding of the output data 1914 by changing a level at which the detections in the output data 1914 are determined (e.g., the low level detection not contributing to the detectable event 1918, being below the threshold, while the mid-level and the high level detections do contribute to the detectable event 1918, being above the threshold). Thus, referring again to FIG. 16, the parameters 1620 may bias the post-processing configuration 1604 in its generation of the detectable events 1618. For example, the parameters 1620 may bias the post-processing configuration 1604 to increase false negatives and decrease false positives, or decrease false negatives and increase false positives.

The post-processing design service 1512 may determine multiple post-processing configurations for post-processing the output data from a configuration of a pipeline (e.g., multiple variations of the post-processing configuration 1604). The post-processing design service 1512 may determine the parameters (e.g., the parameters 1620) for configuring a post-processing configuration. Examples of parameters for configuring a post-processing configuration may include thresholding and filtering. In some implementations, the post-processing design service 1512 may determine or change the parameters based on user input of parameters, the target device 340, an application constraint (e.g., a targeted latency, accuracy, memory usage, and/or energy usage), and/or datasets stored in the database 324. One or more of the user input of parameters, the target device 340, the application constraint, and/or the datasets may be indicated by input from a user, such as via the design control system 320. One or more parameters may be specified and/or modified by a user, such as via the design control system 320. The multiple post-processing configurations may be generated using a multi-objective optimization that varies one or more parameters (e.g., the parameters 1620) for generating the detectable event (e.g., the detectable events 1618, or the detectable event 1918). For example, the post-processing design service 1512 solves an objective optimization problem with respect to precision and recall, or a false acceptance rate and false rejection rate, to determine the post-processing configurations (e.g., a multi-objective optimization to select an optimum trade-off).

As a result, an optimal post-processing stage (e.g., the post-processing configuration 1604) for embedded machine learning can be selected by a user for a given application (e.g., the application 1608), such as by determining an optimal set of post-processing configurations representing a tradeoff between precision and recall, or a false acceptance rate and false rejection rate. The post-processing design service 1512 can receive a selection (e.g., via the design control system 320) of a post-processing configuration from among the multiple post-processing configurations. The configuration service 1510, including the post-processing design service 1512, can configure the the selected post-processing configuration, with a selected pipeline, for an embedded device corresponding to the target device 340.

In some implementations, the post-processing design service 1512 may determine candidate parameters for a post-processing configuration. The post-processing design service 1512 may apply the candidate parameters across an input data set (e.g., using input data, such as the input data 1902) to evaluate an output data set (e.g., the detectable events 1618, or the detectable event 1918). The post-processing design service 1512 may determine performance of the post-processing configuration based on the candidate parameters, such as metrics for precision and recall, or a false acceptance rate and false rejection rate. The post-processing design service 1512 may change the candidate parameters, again and again, to determine performances of post-processing configurations, including sets of candidate parameters that generate optimal trade-offs for precision and recall, or a false acceptance rate and false rejection rate, for a Pareto frontier.

In some implementations, the post-processing configuration 1604 may perform post-processing on the output data 1614 based on the output data 1614 representing probabilities of detections. In some implementations, the post-processing configuration 1604 may perform post-processing on the output data 1614 beyond probabilities. For example, the post-processing configuration 1604 may perform post-processing on the output data 1614 when the pipeline 1602 predicts continuous values. In another example, the post-processing configuration 1604 may perform post-processing on the output data 1614 when the pipeline 1602 predicts structured data, such as bounding boxes around objects.

Figure 20:
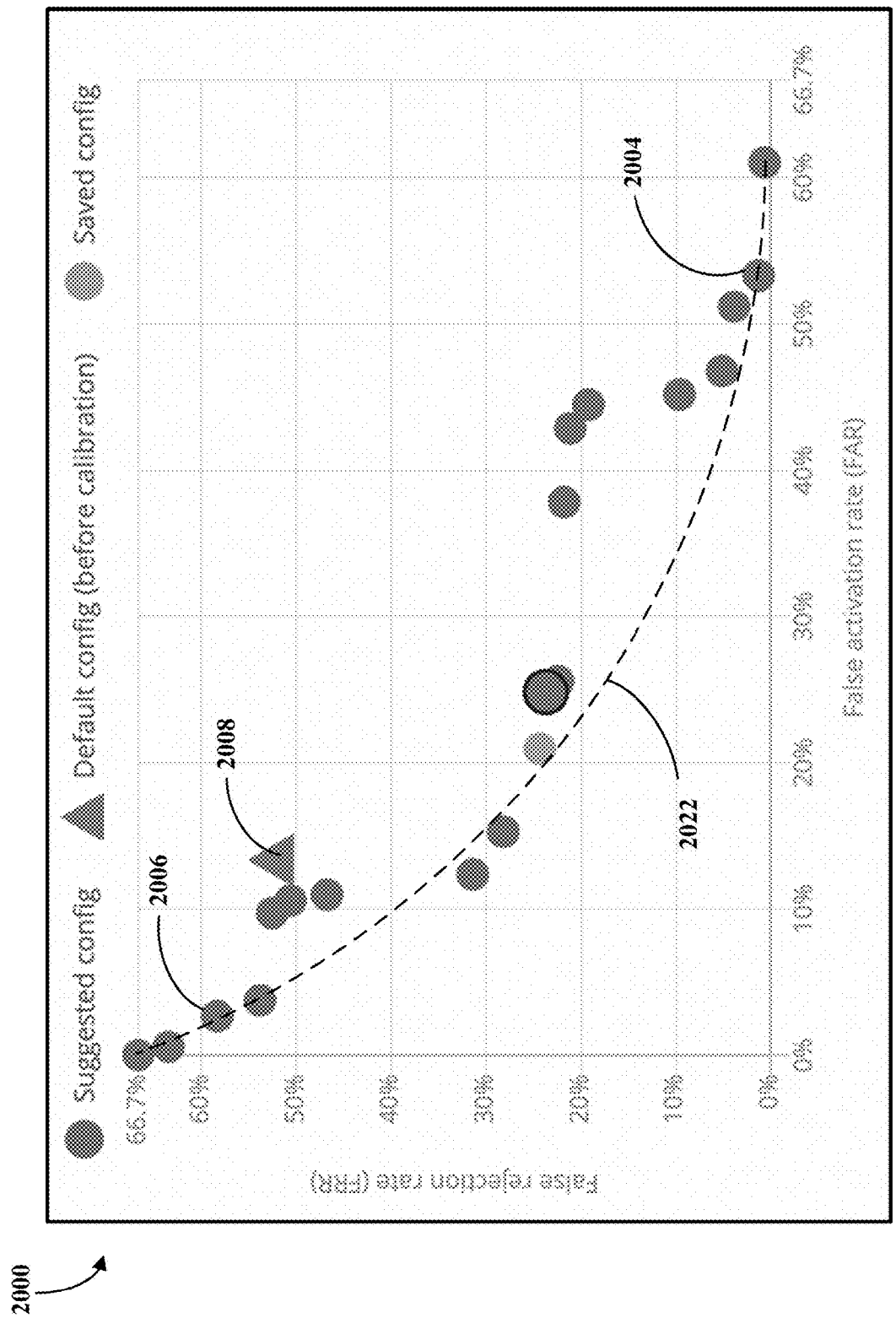
FIG. 20 is an illustration of an example of a GUI indicating multiple post-processing configurations representing a Pareto frontier.

FIG. 20 is an illustration of an example of a GUI 2000 indicating multiple post-processing configurations (e.g., illustrated as "suggested configurations," shown as circles or points) representing a Pareto frontier 2022. For example, the post-processing design service 1512 can perform the multi-objective optimization, based on changing the parameters, to determine the multiple post-processing configurations corresponding to the Pareto frontier 2022. The multi-objective optimization can determine the post-processing configurations by determining, for example, the parameters to achieve optimizations of precision and recall, or false acceptance rate and a false rejection rate, measured for each post-processing configuration. For example, an x-axis may indicate a false acceptance rate (or false activation rate, or FAR), with increasing values to the right indicating an increasing rate in false acceptance (or false activation). A y-axis may indicate a false rejection rate (FRR), with increasing values to the top indicating an increasing rate in false rejections. For example, an ideal configuration could be at the intersection of the x-axis and the y-axis where the FAR and the FRR are both zero.

The Pareto frontier 2022 may represent a balance of the false acceptance rate and the false rejection rate by determining a set of optimal solutions for post-processing configurations that are not dominated by any other feasible solution. In some implementations, the Pareto frontier 2022 may represent a balance of the precision and the recall by determining the set of optimal solutions for post-processing configurations that are not dominated by any other feasible solution. The multi-objective optimization may determine the post-processing configurations by varying, for example, the parameters 1620, such as to control filtering and/or thresholding of the output data. The GUI 2000 may display the multiple post-processing configurations as multiple points representing the Pareto frontier 2022. This may enable selection of a particular post-processing configuration to be implemented by the target device for a particular application (e.g., the application 1608). For example, for an application designed to detect an urgent medical situation such as a patient fall, a user might select a first configuration 2004 that reduces false negatives (e.g., to be more sensitive in the detection, so that a patient fall is not missed). In another example, for an application designed to detect keywords spoken by a user, such as for controlling a smart home device, a user might select a second configuration 2006 that reduces false positives (e.g., to be less sensitive in the detection, so that settings such as lights do not frequently change). The configuration service 1510, including the post-processing design service 1512, may enable such selections while reducing the involvement of a skilled engineer for determining the parameters for post-processing. The GUI may guide a user through identifying and selecting a post-processing configuration with an optimal set of trade-offs for an application.

In some implementations, the GUI 2000 may display a default post-processing configuration, such as the default post-processing configuration 2008. The default post-processing configuration 2008 may represent the parameters that result in a default balance between the false acceptance rate and the false rejection rate, or precision and recall, before applying the multi-objective optimization. The default post-processing configuration 2008 might not be part of the Pareto frontier 2022, indicating that the default post-processing configuration 2008 is not optimized in the balance. Selecting a post-processing configuration on the Pareto frontier 2022, such as the first configuration 2004 or the second configuration 2006, may improve performance for the application.

Figure 21:
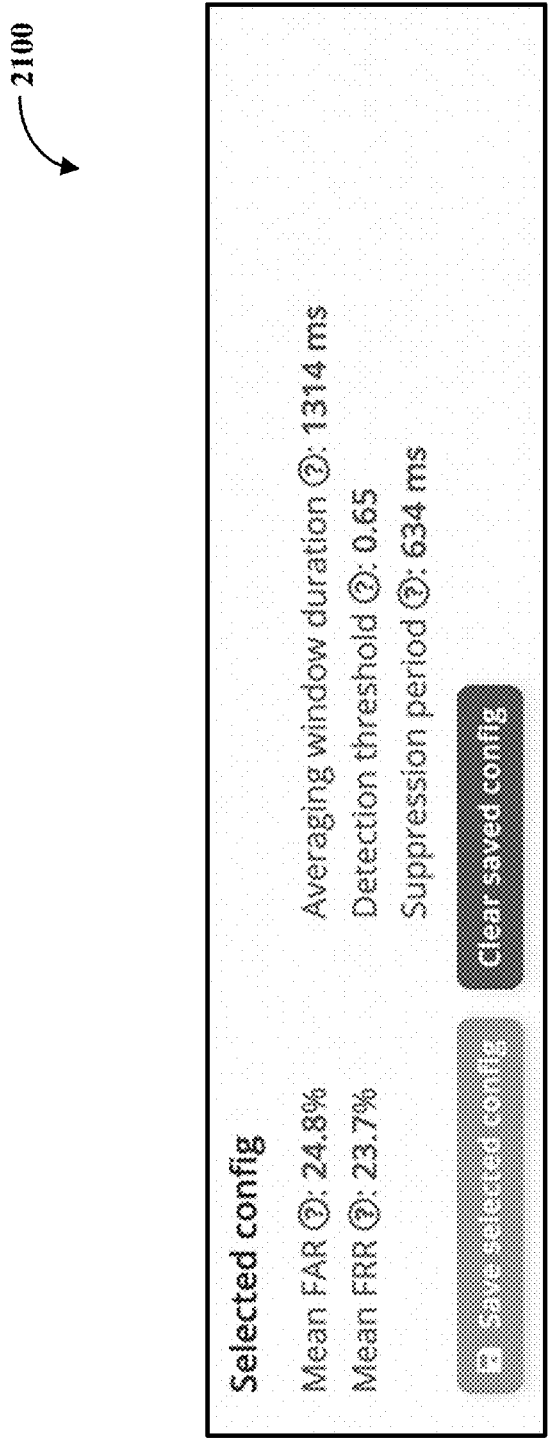
FIG. 21 is an illustration of an example of a GUI indicating a selected post-processing configuration.

FIG. 21 is an illustration of an example of a GUI 2100 indicating a selected post-processing configuration. For example, the GUI 2100 could be displayed after selecting the first configuration 2004 or the second configuration 2006. The GUI 2100 may display performances associated with the post-processing configuration, such as a mean FAR and a mean FRR achieved by the post-processing configuration. The mean FAR and the mean FRR could be represented, for example, as a point on the Pareto frontier 2022. The GUI 2100 may also display an indication of the parameters (e.g., the parameters 1620) used to achieve the post-processing configuration, such as an averaging window duration (e.g., the averaging window 1920), a detection threshold (e.g., the level at which the detections in the output data 1914 are determined), and a suppression period. This may enable selection of the post-processing configuration, such as for implementation on the device 340, or clearing the post-processing configuration and selecting another.

Figure 22:
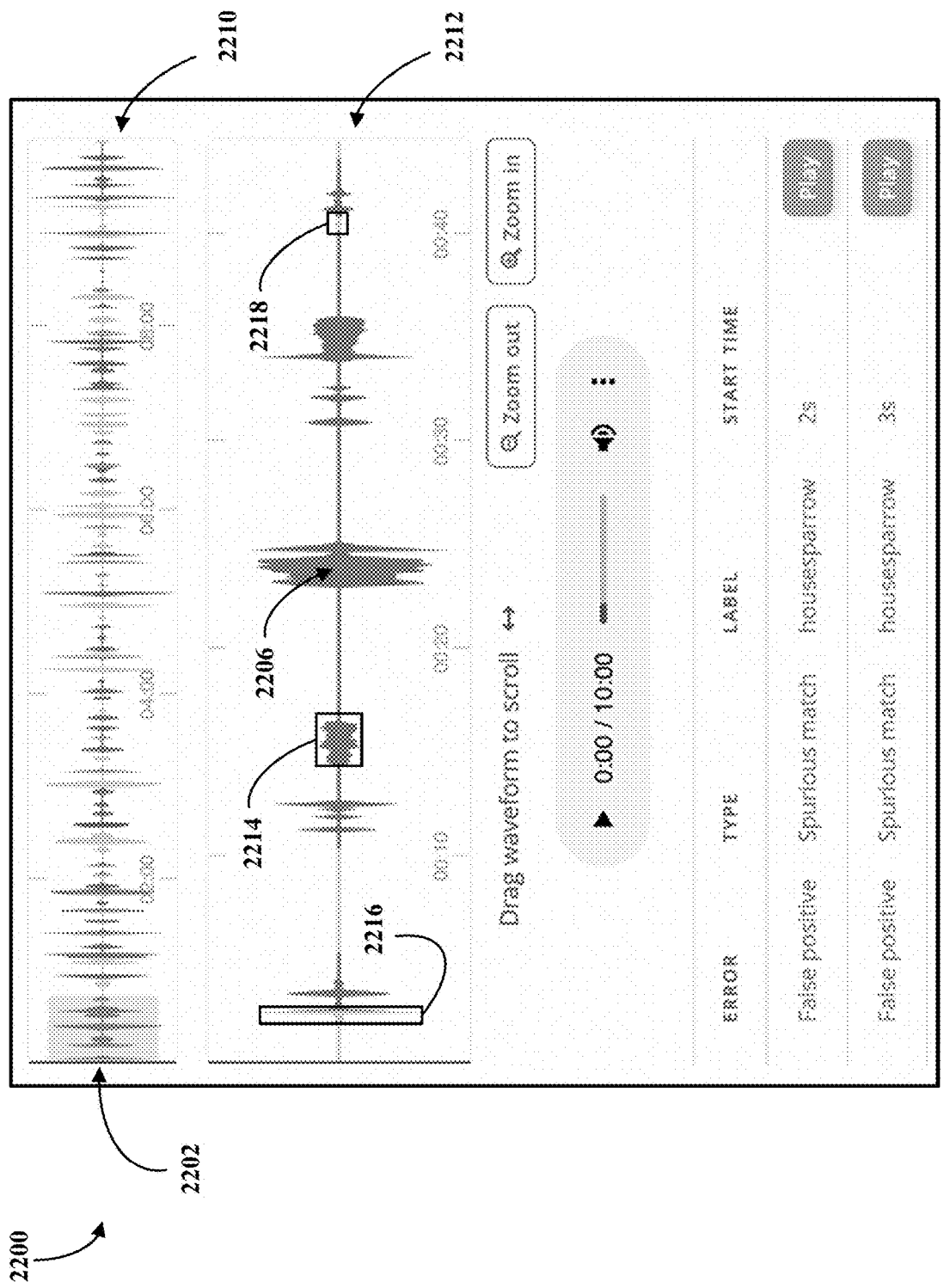
FIG. 22 is an illustration of an example of a GUI for evaluating a post-processing configuration.

FIG. 22 is an illustration of an example of a GUI 2200 for evaluating a post-processing configuration. For example, the test service 316 may be used to test one or more configurations of the post-processing configuration (e.g., the post-processing configuration 1604), including via the design control system 320. The GUI 2200 may display a first waveform 2210, which may indicate input data 2202 (e.g., the input data 1902) received by a pipeline (e.g., the pipeline 1602). The GUI 2200 may also display a second waveform 2212, which may indicate more detail for a specific time period of the first waveform 2210 (e.g., zooming into a particular time). Selecting a signal on the first waveform 2210, or the second waveform 2212, such as the signal 2206, may enable accessing details about the signal, such as determining how the pipeline and the post-processing configuration classified the signal 2206, and/or playing a sound corresponding to the signal 2206. For example, the signal 2206 could be the signal 1906 in the first stream 1904. Selecting the signal may enable analyzing more detail about the classification of the signal 2206, such as whether the signal 2206 was classified correctly or incorrectly, and the basis for such classification. For example, the signal 2206 could be associated with a false positive, such as an incorrect classification of the sound as matching particular label (e.g., a "housesparrow" label).

In some implementations, one or more of the multiple post-processing configurations may be tested by configuring the input data 2202 by adding or changing the occurrences of the one or more detectable events. For example, the GUI 2200 may enable generating a background stream 2204 (e.g., like the first stream 1904), and adding or changing the occurrence of a detectable event 2214 (e.g., which may cause a discrete detectable event in the post-processed output, such as the detectable event 1918) at a predetermined location in the background stream 2204. This may enable testing the pipeline and/or the post-processing configuration with synthetically generated data. In some implementations, one or more of the multiple post-processing configurations may be tested by configuring the input data by adding one or more anomalies. For example, the GUI 2200 may enable generating the background stream 2204, adding a first anomaly 2216 at a first predetermined location in the background stream 2204, and adding a second anomaly 2218 at a second predetermined location in the background stream 2204. An anomaly could include a signal that does not correspond to a label, which signal should not be classified as an activation, and which signal should be classified as a rejection. An anomaly may be used to test for the performance of the post-process configuration, including correctly classifying false activations and false rejections, or precision and recall. This may enable an additional process for testing the pipeline and/or the post-processing configuration with synthetically generated data.

For example, configuring the input data 2202 may enable anomaly detection (e.g., detecting an anomalous event. The configuration service 1510 may inject the anomalies into the input data by synthetically generating anomalies using an algorithm, by using a machine learning model to generate data, or by using a manual process to define the anomaly. That anomaly detection can be used to tune the parameters of the post-processing configuration based on the anomalies. Anomaly detection may enable testing anomalous behaviors, such as a drift in which a signal might gradually change over time (e.g., the sensor 1606 gradually wearing down). Simulating this change in the signal may enable determining optimum parameters, such as a parameter controlling threshold, to reduce drift and improve performance.

Figure 23:
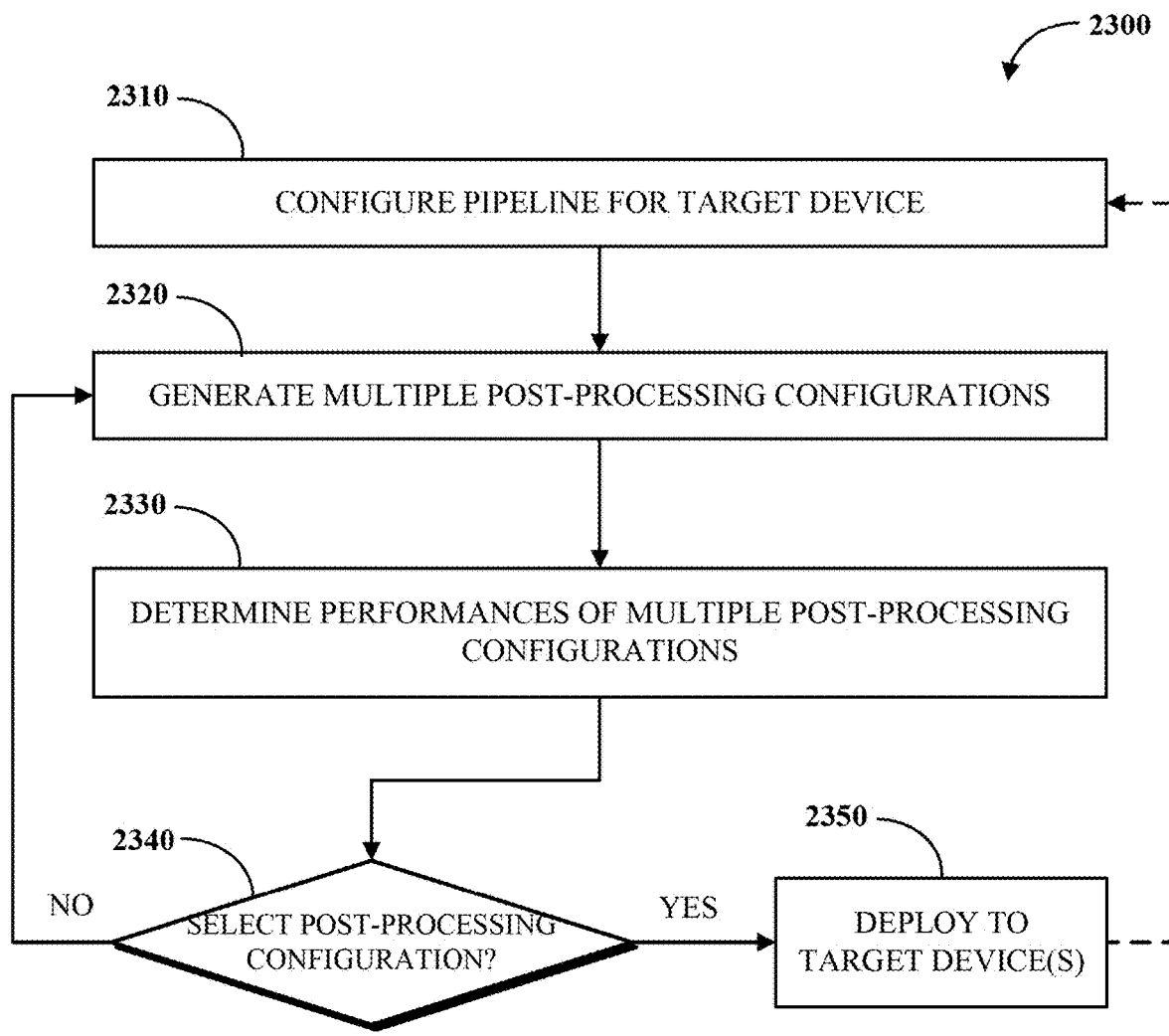
FIG. 23 is a flow chart of an example of a technique for determining a post-processing configuration for post-processing output data from a pipeline.

FIG. 23 is a flow chart of an example of a technique 2300 for determining a post-processing configuration for post-processing output data from a pipeline. The technique 2300 can be executed using computing devices, such as the systems, hardware, and software described with respect to FIGS. 1-16 and 19-22. The technique 2300 can be performed, for example, by executing a machine-readable program or other computer-executable instructions, such as routines, instructions, programs, or other code. The steps, or operations, of the technique 2300 or another technique, method, process, or algorithm described in connection with the implementations disclosed herein can be implemented directly in hardware, firmware, software executed by hardware, circuitry, or a combination thereof.

For simplicity of explanation, the technique 2300 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 2310, a configuration service may configure a pipeline for a target device. For example, the configuration service 1510, using the pipeline design service 314, may configure a pipeline for a target device, such as the pipeline 1602 for the target device 340. For example, a system may use the technique 1400 for configuring the pipeline.

At 2320, the configuration service may generate multiple post-processing configurations. For example, the configuration service 1510, using the post-processing design service 1512, may configure the post-processing configurations for a target device, such as the post-processing configuration 1604 for the target device 340. The post-processing design service can perform a multi-objective optimization, based on changing parameters (e.g., the parameters 1620), to determine the multiple post-processing configurations corresponding to a Pareto frontier (e.g., the Pareto frontier 2022). The multi-objective optimization can determine the post-processing configurations by determining, for example, the parameters to achieve optimizations of precision and recall, or false acceptance rate and a false rejection rate, measured for each post-processing configuration. This may enable selection of a particular post-processing configuration to be implemented by the target device for a particular application (e.g., the application 1608).

At 2330, the system may determine the performances of the multiple post-processing configurations. For example, the configuration service may determine the performances of the post-processing configurations like the post-processing configurations corresponding to the Pareto frontier 2022. The performances associated with the post-processing configurations may include, for example, precision and recall, or false acceptance rate and a false rejection rate, which may be determined by mean values. The performances could be displayed to a GUI, such as the GUI 2000 and/or the GUI 2100.

At 2340, the configuration service may determine whether a post-processing configuration of the multiple post-processing configurations is selected (e.g., receive a selection). A post-processing configuration may be selected, for example, by a user providing input via the design control system (e.g., the design control system 320, such as through the GUI 2000). In some implementations, a post-processing configuration may be automatically selected, such as when a post-processing configuration is determined to satisfy an application constraint. If a post-processing configuration is not selected ("No"), the technique may repeat, such as by returning to 2320 (e.g., to generate additional post-processing configurations) or 2330 (e.g., to determine performances of the post-processing configurations). If a post-processing configuration is selected ("Yes"), the technique may continue at 2350 in which the post-processing configuration may be deployed to the target device (e.g., an embedded device corresponding to the target device), including with the configuration of the pipeline. In some implementations, the post-processing configuration may be implemented on a target device by utilizing a software toolchain for the target device, such as for generating firmware. In some implementations, the target device may be implemented in a field system (e.g., the field system 150), and in some cases, the target device may be used to provide input data to the configuration service as a data source, such as for testing the target device when it is implemented and/or implementing a next target device (e.g., a second target device).

Figure 24:
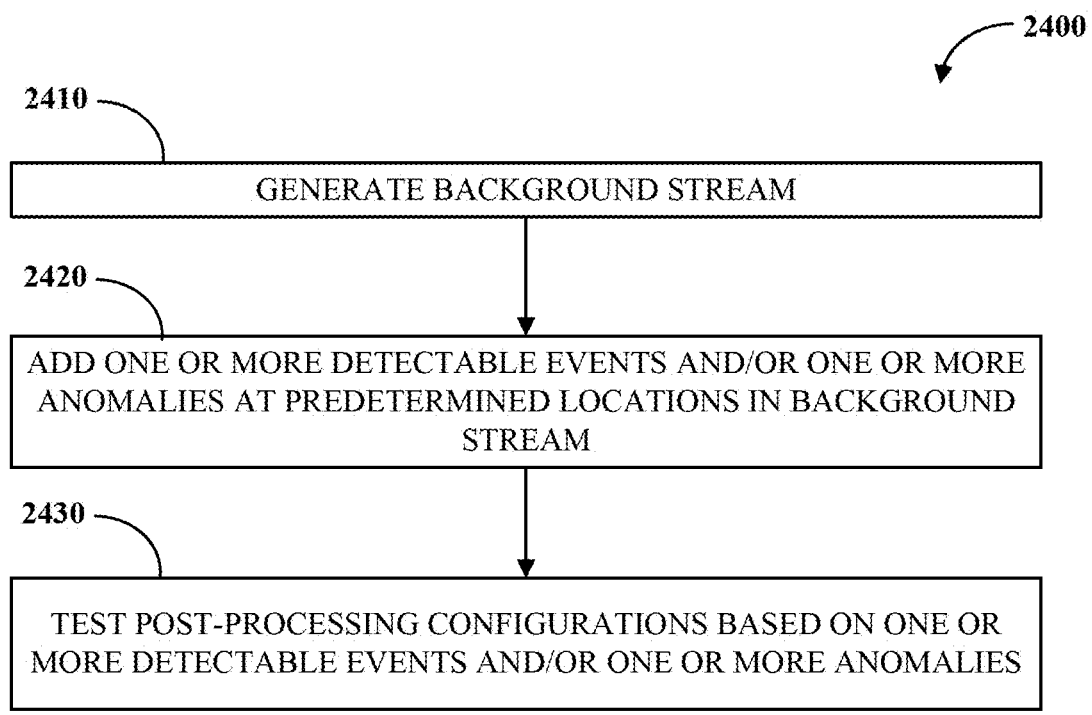
FIG. 24 is a flow chart of an example of a technique for testing a post-processing configuration.

FIG. 24 is a flow chart of an example of a technique 2400 for testing a post-processing configuration. The technique 2400 can be executed using computing devices, such as the systems, hardware, and software described with respect to FIGS. 1-16 and 19-22. The technique 2400 can be performed, for example, by executing a machine-readable program or other computer-executable instructions, such as routines, instructions, programs, or other code. The steps, or operations, of the technique 2400 or another technique, method, process, or algorithm described in connection with the implementations disclosed herein can be implemented directly in hardware, firmware, software executed by hardware, circuitry, or a combination thereof.

For simplicity of explanation, the technique 2400 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject At 2410, a configuration service may generate a background stream. For example, the configuration service 1510, using the test service 316 and/or the design control system 320, may generate a background stream, such as the background stream 2204. For example, a system may use the GUI 2200 for generating the background stream.

At 2420, the configuration service may add one or more detectable events and/or one or more anomalies at predetermined locations in the background stream. For example, the occurrences of the one or more detectable events, such as the detectable event 2214, may be added to the background stream at predetermined locations. A detectable event could include a signal corresponding to a label. A detectable event may be synthetically added to the background stream to test for the performance of a post-process configuration, including correctly classifying false activations and false rejections, or precision and recall. In another example, the one or more anomalies, such as the first anomaly 2216 and the second anomaly 2218, may be added to the background stream at predetermined locations. An anomaly could include a signal that does not correspond to a label. An anomaly may be synthetically added to the background stream to test for the performance of a post-process configuration, including correctly classifying false activations and false rejections, or precision and recall.

At 2430, the configuration service may test one or more post-processing configurations based on the one or more detectable events and/or the one or more anomalies. For example, the post-processing configurations may be tested by providing input data to a pipeline (e.g., the pipeline 1602), based on the background stream including the one or more detectable events and/or one or more anomalies. The pipeline may generate output data (e.g., the output data 1614) based on the input data. A post-processing configurations may generate detectable events (e.g., the detectable events 1618) based on detections in the output data. A post-processing configuration may be selected based on the testing, and the selected post-processing configuration may be deployed to a target device (e.g., an embedded device corresponding to the target device, such as the target device 340).

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an application specific integrated circuit (ASIC)), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    configuring a pipeline for a target device, the pipeline including a signal processing component and a machine learning component, wherein the pipeline is configured to receive input data and generate output data based on the input data; and
    determining multiple post-processing configurations for post-processing the output data, wherein a post-processing configuration is configured to generate a detectable event based on the output data, and wherein the multiple post-processing configurations are generated using a multi-objective optimization that varies one or more parameters for generating the detectable event.

2. The method of claim 1, further comprising:
    receiving a selection of a first post-processing configuration from among the multiple post-processing configurations; and
    configuring the first post-processing configuration for an embedded device corresponding to the target device.

3. The method of claim 1, wherein the one or more parameters are configured to control filtering the output data by changing a window that averages detections in the output data.

4. The method of claim 1, wherein the one or more parameters are configured to control thresholding of the output data by changing a level at which detections in the output data are determined.

5. The method of claim 1, wherein the multi-objective optimization determines the multiple post-processing configurations by determining optimizations of precision and recall.

6. The method of claim 1, wherein the multiple post-processing configurations represent a Pareto frontier that based on precision and recall.

7. The method of claim 1, wherein the multiple post-processing configurations represent a Pareto frontier, the method further comprising:
    configuring a graphical user interface (GUI) to display the multiple post-processing configurations as multiple points of the Pareto frontier.

8. The method of claim 1, further comprising:
    configuring a GUI to display a first post-processing configuration representing a default post-processing configuration before applying the multi-objective optimization.

9. The method of claim 1, further comprising:
    configuring the input data in a background stream and adding one or more detectable events at predetermined locations in the background stream.

10. The method of claim 1, further comprising:
    configuring the input data in a background stream and adding one or more anomalies at predetermined locations in the background stream.

11. The method of claim 1, further comprising:
    determining a latency of an embedded device corresponding to the target device; and
    using the latency to change the one or more parameters.

12. An apparatus, comprising:
    a memory; and
    a processor configured to execute instructions stored in the memory to:
    receive an input indicating a target device;
    configure a pipeline for the target device, the pipeline including a signal processing component and a machine learning component, wherein the pipeline is configured to receive input data and generate output data based on the input data; and
    determine multiple post-processing configurations for post-processing the output data, wherein a post-processing configuration is configured to generate a detectable event based on the output data, and wherein the multiple post-processing configurations are generated using a multi-objective optimization that varies one or more parameters for generating the detectable event.

13. The apparatus of claim 12, wherein the processor is further configured to execute instructions stored in the memory to:
    receive a selection of a first post-processing configuration from among the multiple post-processing configurations; and
    configure the first post-processing configuration for an microcontroller corresponding to the target device.

14. The apparatus of claim 12, wherein the pipeline implements a sound classifier.

15. The apparatus of claim 12, wherein the multi-objective optimization determines the multiple post-processing configurations by determining optimizations of a false acceptance rate and a false rejection rate.

16. The apparatus of claim 12, wherein the multiple post-processing configurations represent a Pareto frontier that based on a false acceptance rate and a false rejection rate.

17. A non-transitory computer readable medium storing instructions operable to cause one or more processors to perform operations comprising:
    configuring a pipeline for a target device, the pipeline including a signal processing component and a machine learning component, wherein the pipeline is configured to receive input data and generate output data based on the input data; and
    determining multiple post-processing configurations for post-processing the output data, wherein a post-processing configuration is configured to generate a detectable event based on the output data, and wherein the multiple post-processing configurations are generated using a multi-objective optimization that varies one or more parameters for generating the detectable event.

18. The non-transitory computer readable medium storing instructions of claim 17, the operations further comprising:
- receiving a selection of a first post-processing configuration from among the multiple post-processing configurations; and
- configuring the first post-processing configuration for an embedded device corresponding to the target device.

19. The non-transitory computer readable medium storing instructions of claim 17, wherein the input data in the first stream is audio data from a microphone.

20. The non-transitory computer readable medium storing instructions of claim 17, the operations further comprising:
- configuring the input data in a background stream and adding one or more anomalies at predetermined locations in the background stream.

\* \* \* \* \*